(12) United States Patent
Heishi et al.

(10) Patent No.: US 6,195,740 B1
(45) Date of Patent: Feb. 27, 2001

(54) CONSTANT RECONSTRUCTING PROCESSOR THAT EXECUTE AN INSTRUCTION USING AN OPERAND DIVIDED BETWEEN INSTRUCTIONS

(75) Inventors: Taketo Heishi; Nobuo Higaki, both of Osaka; Akira Tanaka, Yawata; Tetsuya Tanaka, Ibaraki; Shuichi Takayama, Takarazuka; Kensuke Odani, Kyoto; Shinya Miyaji, Hirakata, all of (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 09/124,659

(22) Filed: Jul. 29, 1998

(30) Foreign Application Priority Data

Jul. 30, 1997 (JP) .................................................. 9-204125

(51) Int. Cl.[7] .............................. G06F 9/30; G06F 9/38; G06F 17/00; G05F 12/00
(52) U.S. Cl. ............................. 712/24; 712/24; 712/210; 712/208; 712/235; 711/167
(58) Field of Search .............................. 712/24, 209, 210, 712/241, 235, 208, 36; 711/167

(56) References Cited

U.S. PATENT DOCUMENTS

| 5,542,067 | * | 7/1996 | Chappell et al. .................... 711/167 |
| 5,761,470 | * | 6/1998 | Yoshida ................................. 712/210 |
| 5,878,267 | * | 3/1999 | Hampapuram et al. ............... 712/24 |
| 5,890,009 | * | 3/1999 | Luick et al. ............................ 712/24 |
| 5,983,757 | * | 11/1999 | Sakhin et al. .......................... 712/24 |
| 6,023,757 | * | 2/2000 | Nishinoto et al. .................... 712/209 |

FOREIGN PATENT DOCUMENTS 408-161169A * 6/1996 (JP) .

* cited by examiner

*Primary Examiner*—Daniel H. Pan
*Assistant Examiner*—Te Su Chen
(74) *Attorney, Agent, or Firm*—Price and Gess

(57) ABSTRACT

A processor for decoding and executing an instruction includes: an instruction register 10 for storing an instruction; a format decoder 21 for decoding a format code located in the P0.0 field 11 of the instruction stored in the instruction register 10; a constant storage unit including a storage region; a constant register control unit 32 which, when the format decoder 21 has referred to the format code and decoded that an operation field includes a constant to be stored in the constant register 36, transfers the constant from the instruction register 10 to the constant storage unit 36; and a constant register output unit 41 which, when the format decoder 21 has referred to the format code and decoded that an operation field includes an operation code showing an operation that should be executed and a piece of an operand that should be used for the operation, links the constant stored in the constant register 36 with the piece of the operand.

26 Claims, 15 Drawing Sheets

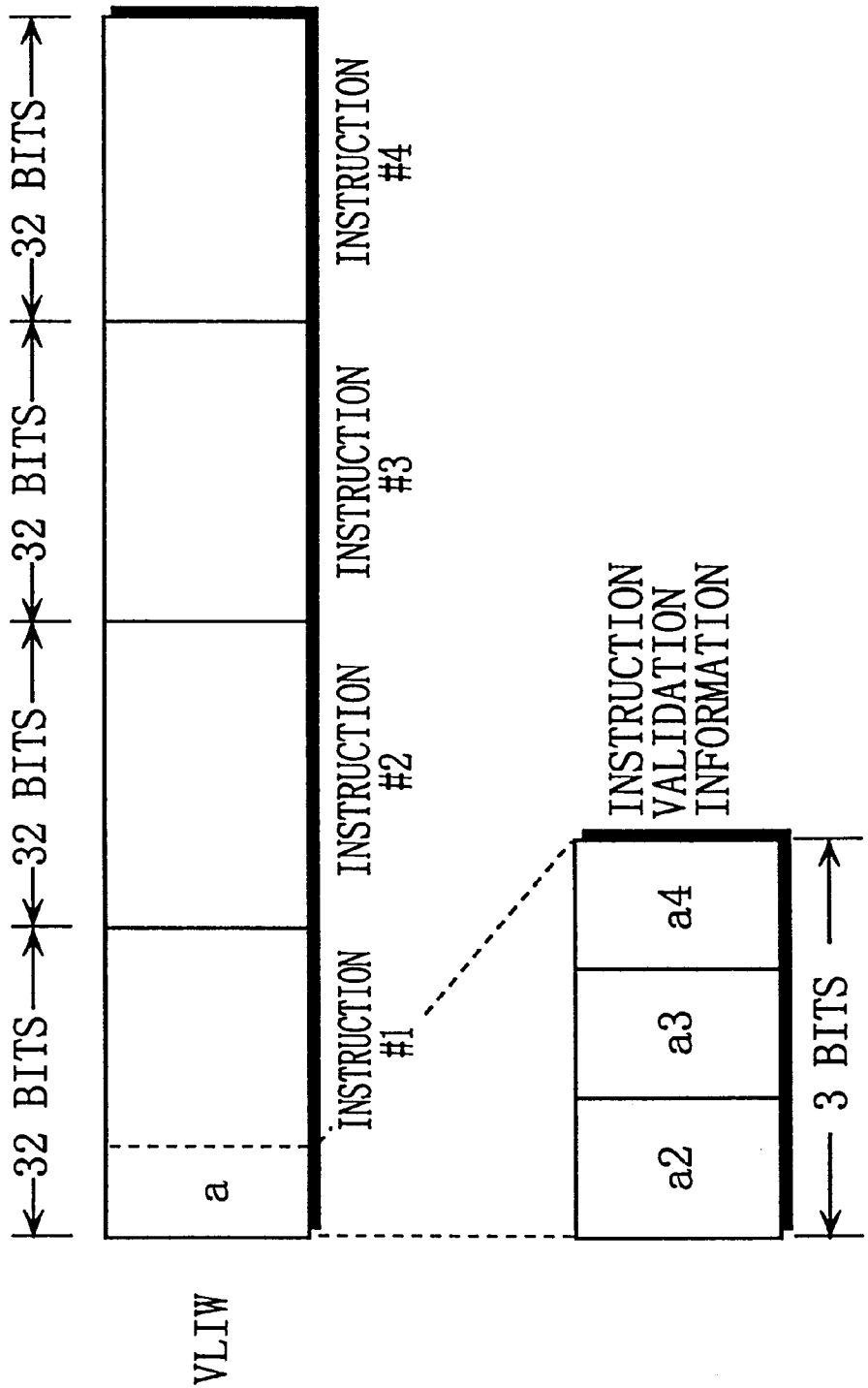

FIG. 2A

50 FIRST OPERATION FIELD 59   SECOND OPERATION FIELD 60

| 0 3 | 4 7 | 8 11 | 12 15 | 16 19 | 20 23 | 24 27 | 28 31 |
|---|---|---|---|---|---|---|---|
| [P0.0] FORMAT CODE | [[P1.0] BRANCH/ CONSTANT | [P2.0] OPERATION CODE/ CONSTANT | [P2.1] SOURCE/ CONSTANT | [P2.2] DESTINATION /CONSTANT | [P3.0] OPERATION CODE/ CONSTANT | [P3.1] SOURCE/ CONSTANT | [P3.2] DESTINATION /CONSTANT |
| 51 | 52 | 53 | 54 | 55 | 56 | 57 | 58 |

FIG. 2B

| 0 | const | op1 | Rs1 | Rd1 | op2 | Rs2 | Rd2 |
|---|---|---|---|---|---|---|---|
| 1 | const | op1 | const1 | Rd1 | op2 | Rs2 | Rd2 |
| 2 | cc | op1 | Rs1 | Rd1 | op2 | Rs2 | Rd2 |
| 3 | cc | op1 | const1 | Rd1 | op2 | Rs2 | Rd2 |

FIG. 2C

| 4 | const | const | const | const | op2 | Rs2 | Rd2 |
|---|---|---|---|---|---|---|---|
| 5 | const | op1 | Rs1 | Rd1 | const | const | const |
| 6 | const1 | op1 | const1 | Rd1 | op2 | Rs2 | Rd2 |
| 7 | const2 | op1 | Rs1 | Rd1 | op2 | const2 | Rd2 |
| 8 | const1 | op1 | const1 | Rd1 | op2 | const2 | Rd2 |
| 9 | const2 | op1 | const1 | Rd1 | op2 | const2 | Rd2 |
| A | cc | const2 | const2 | const2 | op2 | const2 | Rd2 |

FIG. 2D

| B | const2 | const2 | const2 | const2 | op2 | const2 | const2 |
|---|---|---|---|---|---|---|---|
| C | reserved ||||||||
| D | reserved ||||||||
| E | reserved ||||||||
| F | reserved ||||||||

FIG. 3

| SYMBOL | OPERATION | MNEMONIC NOTATION |
|---|---|---|
| cc | branch | eq, eqi, gt, gti, jmp, jmpi, · · · |
| op1 | ARITHMETIC LOGIC OPERATION | add, sub, mul, and, or, cmp, · · · |
| op1 | INTER-REGISTER TRANSFER | mov, movh, movb, setl4 |
| op2 | ARITHMETIC LOGIC OPERATION | add, sub, mul, and, or, cmp, · · · |
| op2 | INTER-REGISTER TRANSFER | mov, movh, movb, setl4 |
| op2 | REGISTER-MEMORY TRANSFER | ld, ldh, ldb, st, sth, stb |

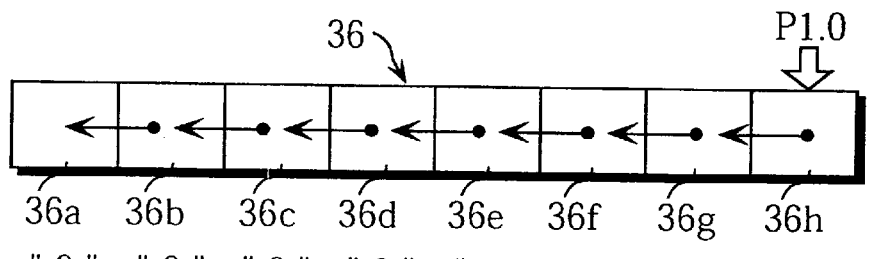
FIG. 7A
FIG. 7B
FIG. 7C
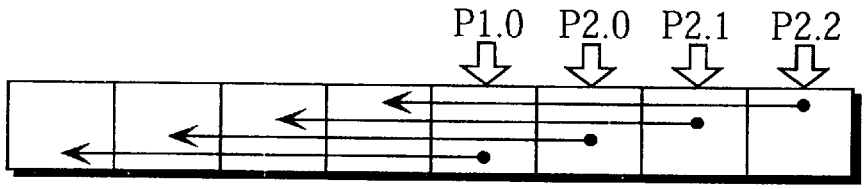
FIG. 7D
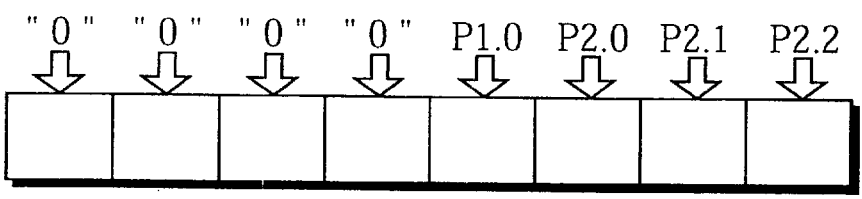
FIG. 7E
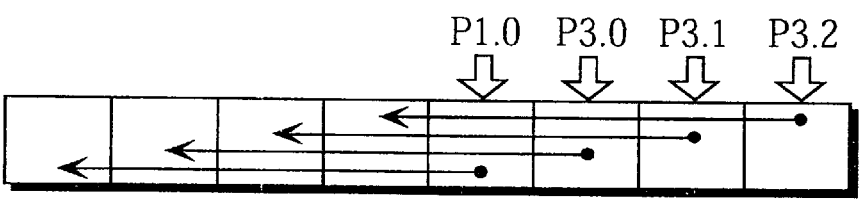
FIG. 7F
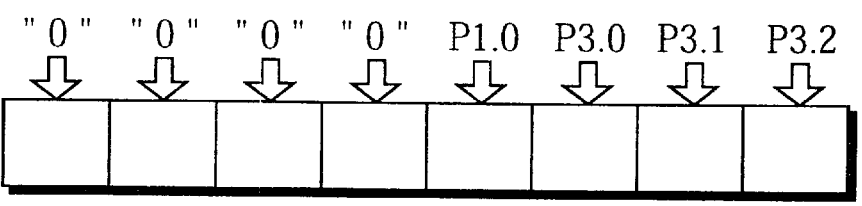
FIG. 7G
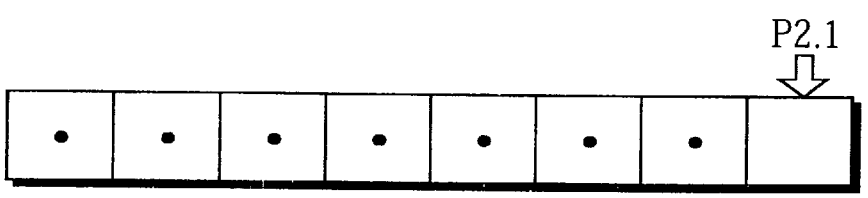
FIG. 7H
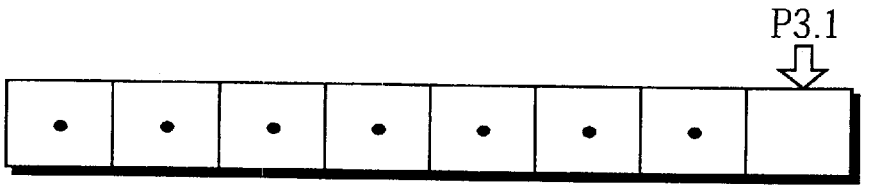

|  | 36a | 36b | 36c | 36d | 36e | 36f | 36g | 36h | | 28 | | | | | |
|---|---|---|---|---|---|---|---|---|---|---|---|---|---|---|---|
| Fig. 8A | 8 | 7 | 6 | 5 | 4 | 3 | 2 | 1 | | 1 | 0 | 0 | 0 | 0 | 1 |
| Fig. 8B | 0 | 0 | 0 | 0 | 0 | 0 | 0 | 8 | | | | | | | |
| Fig. 8C | 0 | 0 | 0 | 0 | 0 | 0 | 8 | 7 | | | | | | | |
| Fig. 8D | 0 | 0 | 0 | 0 | 0 | 8 | 7 | 6 | | | | | | | |
| Fig. 8E | 0 | 0 | 0 | 0 | 8 | 7 | 6 | 5 | | | | | | | |
| Fig. 8F | 0 | 0 | 0 | 8 | 7 | 6 | 5 | 5 | | | | | | | |

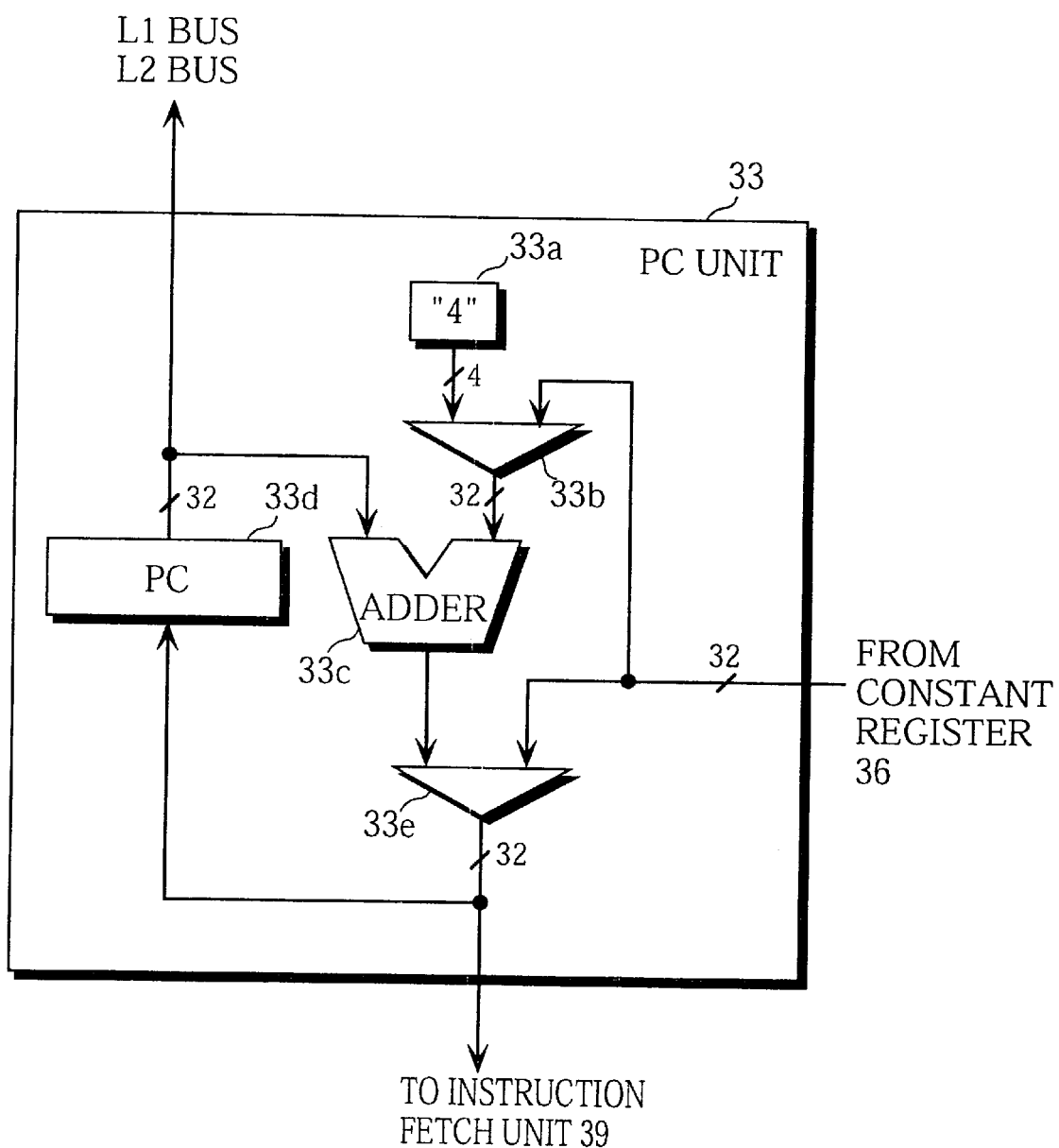

Fig. 11

| P0.0 | P1.0 | P2.0 | P2.1 | P2.2 | P3.0 | P3.1 | P3.2 |
|------|------|------|------|------|------|------|------|
| fmt 4 |  | 0x8765 | | | sub | R1 | R0 |
| fmt 6 | 0x4 | add | 0x3 | R0 | mov | R2 | R1 |

Fig. 13

| P0.0 | P1.0 | P2.0 | P2.1 | P2.2 | P3.0 | P3.1 | P3.2 |
|------|------|------|------|------|------|------|------|
| fmt 4 | | 0x0087 | | | Sub | R1 | R0 |
| fmt 4 | | 0x6543 | | | mov | R2 | R1 |
| fmt 2 | nop | add | R16 | R0 | nop | | |

73 → P3.0 column, 74 → P3.1 column, 75 → P3.2 column

Fig. 14

| P0.0 | P1.0 | P2.0 | P2.1 | P2.2 | P3.0 | P3.1 | P3.2 |
|------|------|------|------|------|------|------|------|
| fmt 4 | | 0x1234 | | | cmp | R0 | R2 |
| fmt 2 | eqi | add | R2 | R1 | cmp | R4 | R1 |
| fmt 2 | gti | add | R3 | R2 | mov | R2 | R0 |

76 → P3.0 column, 77 → P3.1 column, 78 → P3.2 column

Fig. 15

| P0.0 | P1.0 | P2.0 | P2.1 | P2.2 | P3.0 | P3.1 | P3.2 |
|------|------|------|------|------|------|------|------|
| fmt 4 |  | 0x3210 | | | cmp | R0 | R2 |
| fmt 2 | eqi | cmp | R2 | R1 | setl4 | 0xc | — |
| fmt 2 | gti | add | R3 | R2 | mov | R2 | R0 |

↑79  ↑80  ↑81

CONSTANT RECONSTRUCTING PROCESSOR THAT EXECUTE AN INSTRUCTION USING AN OPERAND DIVIDED BETWEEN INSTRUCTIONS

BACKGROUND OF THE INVENTION

1. Field of the Invention

The present invention relates to microprocessors and in particular to a technique for making effective use of unused areas that are present within instructions and for preventing unnecessary increases in code size and the number of execution cycles.

2. Description of the Prior Art

In recent years, increases in processing capability and processing speed of appliances using embedded microprocessors have led to an increasing demand for microprocessors (hereinafter simply referred to as "processors") that can execute programs with high code efficiency. This means that it is preferable for there to be no unused areas in the instructions which compose a program.

In particular, when using fixed length instructions, such as VLIW (Very Long Instruction Words), there are cases when it is necessary to insert redundant codes, such as no-operation codes ("nop" codes), into instructions. VLIW are composed of a plurality of operation fields, with each operation field specifying an operation which corresponds to one of a plurality of operation units provided within a processor. Due to interdependencies between operations, however, it is not always possible to process a plurality of operations using parallel processing.

One conventional method of avoiding the decreases in code efficiency that accompany the insertion of "nop" codes is the VLIW-type computer system disclosed by Japanese Laid-Open Patent Application H08-161169.

FIG. 1 shows the instruction format used in the above technique.

As shown in FIG. 1, when a "nop" code needs to be inserted into operation field #2, this technique inserts a constant that is to be used by a different operation in place of the "nop" code into operation field #2 and inserts instruction validation information into one part of operation field #1 to show that the constant has been inserted. When executing this instruction, a processor first refers to the instruction validation information and so determines that only a constant is present in operation field #2. The processor then uses this constant as the operand of an operation. In this way, the existence of redundant areas within instructions due to the insertion of "nop" codes can be avoided.

The above technique, however, has a drawback in that the size of the constants that can be inserted into the redundant areas is limited.

As one example, when it is necessary to insert a "nop" code into a 32-bit operation field, it is not possible to insert any part of a 64-bit constant. similarly, when there is an unused 8-bit area in a fixed 32-bit instruction, it is only possible to use the unused area when inserting a constant which is 8 bits long or shorter. In this case, it is not possible to insert an absolute address which is expressed using 32 bits.

While the above technique may be effective when there is a relatively large redundant area in an instruction, when instructions have a relatively short length, such as 32 bits, any redundant area in the instructions will naturally be short, preventing the insertion of constants into a large number of redundant areas when using the above technique. This constitutes a major problem.

SUMMARY OF THE INVENTION

In view of the stated problems, it is the object of the present invention to provide a processor that fills unused areas that cannot be filled by a conventional processor with pieces of an operand for an operation and uses an instruction which gives the remaining pieces of the operand and an operation code for the operation. With this processor, code size and the number of execution cycles are reduced in comparison with a processor which uses instructions including all pieces of an operand and an instruction for executing an operation using the operand.

The object of the present invention can be achieved by a processor for decoding and executing an instruction, the processor including: an instruction register for storing the instruction; a decoding unit for decoding the stored instruction; a constant storage unit including a storage region; a constant transfer unit which, in a first case when the decoding unit has decoded that the instruction includes a first constant that should be stored into the constant storage unit, transfers the first constant from the instruction register to the constant storage unit; and an execution unit which, in a second case when the decoding unit has decoded that the instruction includes an operation code showing an operation that should be executed and a piece of an operand to be used for the operation, executes the operation using an operand obtained by linking the piece of the operand and a constant stored in the constant storage unit.

With the stated construction, pieces of an operand to be used for an operation are stored in a constant storage unit beforehand. An operation can be executed using the operand obtained by linking the stored pieces of the operand and the remaining pieces of the operand directly indicated by an instruction. Therefore, an operand for an operation is divided between instructions.

Accordingly, even when an instruction includes a small unused area which is smaller than an operand for an operation, this small unused area can be filled with one piece of the operand.

Furthermore, a single instruction can directly indicate the remaining pieces of the operand at the same time as executing an operation using the pieces of the operand stored in the constant storage unit and the remaining pieces of the operand. Accordingly, with this processor, the number of instructions is reduced in comparison with a processor which uses instructions including all pieces of an operand and an instruction for executing an operation using the operand. This assists in the generation of programs with high code efficiency.

Here, the execution unit may include: a first read unit for reading the constant stored in the constant storage unit in the second case; a second read unit for reading the piece of the operand from the instruction register; a link unit for linking the read constant with the read piece of the operand to generate an operand and outputting the operand; and an operation unit for executing the operation using the output operand.

With the stated construction, the first read unit and the second read unit perform their read operations in parallel. Accordingly, all pieces of an operand do not need to be stored in the constant storage unit before the execution of an operation using the operand. As a result, the processing time can be shortened by the time necessary to store into the constant storage unit the pieces of the operand which can be directly indicated with the processor of the present invention.

Here, the link unit may shift the read constant by a number of bits in the read piece of the operand and place the read piece of the operand at a blank position obtained after the read constant is shifted, so that the read constant and the read piece of the operand are linked.

With the stated construction, pieces of an operand that have been stored in the constant storage unit are shifted by the number of bits in the remaining pieces of the operand directly indicated by an instruction. As a result, the digit position in the constant storage unit for storing pieces of an operand beforehand can be fixed, eliminating the need to manage the digit position.

Here, the constant transfer unit may store a valid state data indicating whether the constant storage unit stores a valid constant, where when the valid state data indicates that the constant storage unit does not store a valid constant in the first case, the constant transfer unit transfers the first constant from the instruction register to the constant storage unit so that the first constant becomes a valid constant, and when the valid state data indicates that the constant storage unit stores a valid constant in the first case, the constant transfer unit transfers the first constant from the instruction register to the constant storage unit without deleting the stored valid constant and links the stored valid constant with the first constant to generate a new valid constant.

With the stated construction, pieces of a constant that are provided in a plurality of instructions can be accumulated and linked in the constant storage unit to restore the original constant. Accordingly, even when there is a small redundant area in an instruction, this small area can be used to store one piece of a constant whose number of digits exceeds that of the small area. This assists in the generation of programs with high code efficiency.

Here, the constant transfer unit may shift the valid constant in the constant storage unit by a number of bits in the first constant and transfer the first constant from the instruction register to a blank area in the constant storage unit obtained by shifting the valid constant, so that the valid constant and the first constant are linked.

With the stated construction, one piece of an operand that has been stored in the constant storage unit is shifted by the number of bits of another piece of the operand. As a result, the digit position in the constant storage unit for storing each piece of an operand can be fixed, eliminating the need to manage the digit position.

Here, the constant transfer unit may further store position data showing an area of the storage region adjacent to a valid constant stored in the constant storage unit, and the constant transfer unit may transfer the first constant from the instruction register to the storage region according to the position data to link the valid constant with the first constant.

By doing so, there will be no change in the digit positions of constants that are stored in the constant storage unit. Accordingly, scheduling becomes simple for a compiler that divides a constant between unused areas in a plurality of instructions.

Here, when transferring the first constant from the instruction register to the constant storage unit, the constant transfer unit may change the valid state data to show that the constant storage unit stores a valid constant, and when the first reading unit reads a constant stored in the constant storage unit, the constant transfer unit may clear the storage region and change the valid state data to show that the constant storage unit does not store a valid constant.

By doing so, it can be guaranteed just by storing a constant in the constant storage unit that the stored constant will have been given a zero extension. Accordingly, separate deletion instructions for clearing the constant storage unit are not required whenever the stored value of the constant storage unit is read.

Here, the constant transfer unit may further store read state data showing whether a constant has been read from the constant storage unit, where when the read state data shows that the constant has been read from the constant storage unit in the first case, the constant transfer unit clears the storage region, transfers the first constant from the instruction register to the constant storage unit, and changes the read state data to show that a constant has not been read from the constant storage unit, when the read state data shows that a constant has not been read from the constant storage unit in the first case, the constant transfer unit transfers the first constant from the instruction register to the constant storage unit without deleting the constant in the constant storage unit and links the constant with the first constant to generate a new constant, and when the first read unit reads a constant from the constant storage unit in the second case, the constant transfer unit changes the read state data to show that the constant has been read from the constant storage unit.

By doing so, it can be guaranteed just by storing a constant in the constant storage unit that the stored constant will have been given a zero extension. Accordingly, separate deletion instructions for clearing the constant storage unit are not required whenever the stored value of the constant storage unit is read.

Here, the constant transfer unit may further store digit data showing a digit position adjacent to a valid constant stored in the constant storage unit, and the link unit may link a piece of an operand read by the second read unit at the digit position shown by the digit data concerning a constant read by the first read unit to generate the operand.

By doing so, there will be no change in the digit positions of constants that are stored in the constant storage unit. Accordingly, scheduling becomes simple for a compiler that divides a constant between unused areas in a plurality of instructions.

Here, where in a third case when the decoding unit has decoded that the instruction includes an operation code showing an operation that should be executed and a constant stored in the constant storage unit is an operand that should be used for the operation, the execution unit may execute the operation using the operand.

With the stated construction, a constant that is stored in the constant storage unit is used as an operand as it is, so that the flexibility of the scheduling by a compiler increases.

Here, the execution unit may include: a first read unit for reading a constant stored in the constant storage unit in either of the first case and the third case; a second read unit for reading a piece of an operand from the instruction register in the first case; a link unit for outputting an operand obtained by linking the read constant with the read piece of the operand in the first case and for outputting the read constant as an operand in the third case; and an operation unit for executing the operation of either the first case and the third case using the outputted operand.

With the stated construction, the first read unit and the second read unit perform their read operations in parallel. Accordingly, all pieces of an operand do not need to be stored in the constant storage unit before the execution of an operation using the operand. As a result, the processing time can be shortened by the time necessary to store into the constant storage unit the pieces of the operand which can be directly indicated with the processor of the present invention.

Here, the constant storage unit may include: n constant registers from a first constant register to an nth constant register which each have a storage region of a predetermined number of bits so that the n constant registers have a total storage region of n times the predetermined number of bits (n being a natural number no less than 2), and the execution unit may include: n selection unit from a first selection unit to an nth selection unit which each select and output a constant of the predetermined number of bits so that the n selection unit output an operand of n times the predetermined number of bits in total, where the first selection unit is connected to an area of the instruction register of the predetermined number of bits and to the first constant register, and selects a constant of the predetermined number of bits in the instruction register in the second case and selects a constant stored in the first constant register in the third case, and the mth selection unit is connected to the (m−1)th constant register and to the mth constant register, and selects a constant stored in the (m−1)th constant register in the second case and selects a constant stored in the mth constant register in the third case (m being a natural number where 2≦m≦n); and an operation unit for executing an operation using an operand outputted from the n selection unit.

With the stated construction, in the second case, pieces of an operand that are stored in the constant storage unit beforehand can be read and shifted. The remaining pieces of the operand are read from the instruction register and linked with shifted pieces of the operand at the same time. Also, in the third case, an operand that is stored in the constant storage unit beforehand is read without being shifted.

Accordingly, the processing time can be shortened, management of digit positions is not necessary, generation of programs with high code efficiency is supported, and the flexibility of the scheduling by the compiler can be increased.

For a VLIW processor that executes instructions made up of a plurality of operations which are to be subjected to parallel processing, when operations to be processed in parallel are not present, a constant for use by a later instruction can be located into the instruction in place of an operation.

With the stated construction, constants can be inserted into not only unused areas that exist in instructions that indicate a single operation, but also into unused areas in VLIW that can indicate two or more operations in a single instruction.

For a VLIW processor that executes instructions made up of a plurality of operations which are to be subjected to parallel processing, instructions, which include a constant for use by a later instruction in place of an operation when operations that can be subjected to parallel processing are not present, may be used to have certain operations that do not involve the constant executed in parallel while at the same time accumulating pieces of a constant in order.

By doing so, when a constant is located in only one part of a VLIW, the storage of this constant can be performed in parallel with other operations indicated by the VLIW. Since this accumulated constant can be used by a later instruction, a constant of long word length may be divided and located in a plurality of instructions.

The above object of the present invention can be achieved by a VLIW processor for decoding and executing an instruction, the instruction including a format field for storing a format code that specifies an instruction format and a plurality of operation fields for specifying operations that are to be processed in parallel, the VLIW processor including: an instruction register for storing the instruction; a decoding unit for decoding the format code held by the instruction register; a constant storage unit including a storage region; a constant transfer unit which, in a first case when the decoding unit has referred to the format code and decoded that at least one of the plurality of operation fields includes a first constant that should be stored into the constant storage unit, transfers the first constant from the instruction register to the constant storage unit; and an execution unit which, in a second case when the decoding unit has referred to the format code and decoded that at least one of the plurality of operation fields includes an operation code showing an operation that should be executed and a piece of an operand that should be used for the operation, executes the operation using an operand obtained by linking a constant stored in the constant storage unit and the piece of the operand.

With the stated construction, when generating a VLIW sequence to be executed by the processor, it is possible to divide a constant of long word length between a plurality of VLIW. The positions within instructions used for locating constants (operation fields) are clearly indicated by the format code, while the storage destination of a constant (the constant register) and the storage position (bit position within the constant register) are implicitly indicated, so that it is unnecessary to provide an explicit operation code for storing a constant given in an instruction into a specified position in the constant register.

Furthermore, with a single instruction, pieces of an operand can be directly indicated and at the same time an operation can be executed using pieces of the operand stored in the constant storage unit as well as the indicated pieces of the operand. Accordingly, with this processor, the number of instructions is reduced in comparison with a processor which uses operations for dividing an operand and storing divided pieces of the operand and a separate operation using the operand. This assists in the generation of programs with high code efficiency because the number of operations is reduced. The positions within instructions used for locating constants (operation fields) are clearly indicated by the format code, while the storage destination of an operand (the constant storage unit) and the storage position (bit position within the constant storage unit) are implicitly indicated, so that it is unnecessary to provide an explicit operation code for reading an operand stored into a specified position in the constant storage unit.

With the present invention described above, when generating a sequence of machine language instructions using a compiler or the like, a constant which is used by a later instruction can be divided and inserted into unused areas which are unavoidably left in the generated instructions. This enables optimal scheduling to be performed, and results in reductions in code size, an effect which is of particular value to embedded processors.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1 shows the instruction format used under the prior art;

FIG. 2A shows the field structure of an instruction that is executed by the processor of the present invention;

FIGS. 2B to 2D show sixteen types of instruction format, with FIG. 2B showing triple operation instructions, FIG. 2C showing twin operation instructions, and FIG. 2D showing single operation instructions;

FIG. 3 is a table showing specific operations that are indicated by the three types of operation code, "cc", "op1", and "op2", that are used in FIGS. 2B to 2D;

FIGS. 7A to 7H are representations of different methods for storing a constant by the constant register control unit 32 shown in FIG. 5, with FIG. 7A showing the case when the format code is "0" or "1" and the read flag is "0", FIG. 7B showing the case when the format code is "0" or "1" and the read flag is "1", FIG. 7C showing the case when the format code is "4" and the read flag is "0", FIG. 7D showing the case when the format code is "4" and the read flag is "1", FIG. 7E showing the case when the format code is "5" and the read flag is "0", FIG. 7F showing the case when the format code is "5" and the read flag is "1", FIG. 7G showing the case when the first operation is "setl4", and FIG. 7H showing the case when the second operation is "setl4";

FIGS. 8A to 8F show the changes in the values of the read flag storage unit 28 and the constant register 36, with FIG. 8A showing the values immediately after the constant "0x87654321" has been read from the constant register 36, FIGS. 8B to 8E showing the values immediately after the 4-bit constants "0x8", "0x7", "0x6", and "0x5" have successively been stored in the constant register 36, and FIG. 8F showing the values immediately after the constant "0x00008765" shown in FIG. 8E has been read from the constant register 36;

FIG. 9 is a block diagram showing the detailed construction of the PC unit 33 of the present processor;

FIG. 11 shows an example of a program that has the present processor perform the same processing content as the flowchart shown in FIG. 10;

FIG. 13 shows an example of a program that has a comparison processor perform the same processing content as the flowchart shown in FIG. 10;

FIG. 14 shows an example of a program including branch operations;

FIG. 15 shows an example of a program including the "setl4" operation described in the explanation of FIGS. 7G and 7H.

DESCRIPTION OF THE PREFERRED EMBODIMENTS

Figure 4:
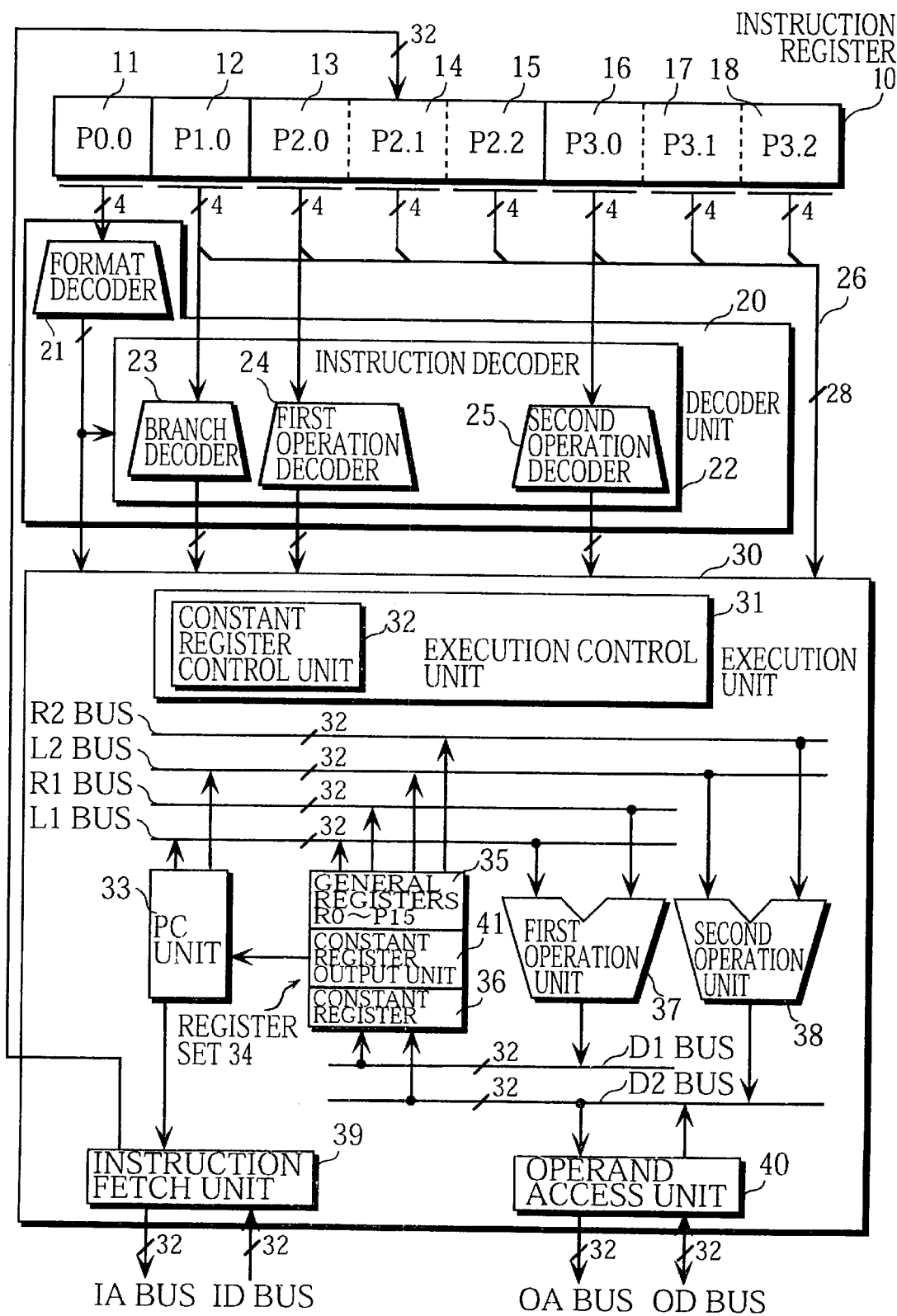
FIG. 4 is a block diagram showing the hardware construction of the present processor.

An embodiment of the processor of the present invention is described in detail below with reference to the figures. In this specification, the expression "instruction" refers to a set of code that is decoded and executed by the present processor simultaneously and in parallel, while the expression "operation" refers to a unit of processing, such as an arithmetic operation, a logic operation, a transfer, or a branch, which is executed by the present processor in parallel, as well as to the code which indicates each unit of processing.

Embodiment

The processor of the present embodiment realizes the above object of the present invention. This processor is characterized by a function for accumulating pieces of a constant to be used in an operation in the constant register before the operation is executed and for executing the operation using the constant stored in the constant register and constants directly indicated by instructions. This processor is also characterized by a function for restoring what was originally a single constant by accumulating pieces of the single constant in a specialized register (in a digit direction).

Instruction Format

First, the structure of the instructions that are decoded and executed by the present processor will be described.

The present processor is a processor employing VLIW architecture (hereinafter referred to as a "VLIW processor") that decodes and executes instructions with a fixed word length of 32 bits.

FIG. 2A shows the field structure of an instruction 50 to be executed by the present processor.

FIGS. 2B to 2D, meanwhile, show sixteen instruction formats. Of these, the instruction formats in FIG. 2B simultaneously indicate three operations, the instruction formats in FIG. 2C two operations, and the instruction formats in FIG. 2D a single operation.

This instruction 50 has a fixed word length of 32 bits and is composed of eight 4-bit physical fields shown in order starting from the MSB (Most Significant Bit) as P0.0 field 51, P1.0 field 52, P2.0 field 53, P2.1 field 54, P2.2 field 55, P3.0 field 56, P3.1 field 57, and P3.2 field 58 in FIG. 2A. Of these, the range from the P2.0 field 53 to the P2.2 field 55 is called the first operation field 59, while the range from the P3.0 field 56 to the P3.2 field 58 is called the second operation field 60.

In FIGS. 2B to 2D, the legend "const" indicates a constant, and, depending on the operation in which it is used, this can be a numeric constant or a character constant such as an immediate, an absolute address, or a displacement. The legend "op" represents an operation code that indicates an operation type, while the legend "Rs" indicates the register used as the source operand, "Rd" the register used as the destination operand, and "cc" an operation code indicating a branch operation that uses the stored value of a specialized 32-bit register provided in the present processor (the constant register 36 shown in FIG. 4) as the absolute address or relative address (displacement) of a branch destination.

The actual operation for each instruction format is described in detail later.

FIG. 3 shows specific examples of the operations that can be indicated by the three kinds of operation code "cc", "op1", and "op2" given in FIGS. 2B to 2D.

The 4-bit operation code "cc" indicates one out of sixteen types of branch instruction. Each branch instruction is specified as a branch condition and a branch format. Examples of branch conditions include "equal to ('eq')", "not equal to ('neq')", and "greater than ('gt')". The branch format can be a format where the stored value of the constant register 36 serves as the absolute address of the branch destination (denoted by having no "i" attached to the instruction mnemonic), or a format where the stored value of the constant register 36 serves as a relative address (denoted by having "i" attached to the instruction mnemonic). As one example, the operation code "eq" represents an operation that branches to a destination indicated through absolute addressing when a preceding comparison finds the compared values to be equal, while the operation code "eqi" represents an operation that branches to a destination indicated through relative addressing when a preceding comparison finds the compared values to be equal.

The 4-bit operation code "op1" can be used to indicate an arithmetic logic operation, such as any of an "add" (addition), a "sub" (subtraction), a "mul" (multiplication), an "and" (logical AND), or an "or" (logical OR), or an operation that is an inter-register transfer, such as any of a "mov" (transfer of word (32-bit) data), a "movh (transfer of halfword data), or a "movb" (transfer of one byte data). As a transfer operation, a "setl4" operation for replacing lower 4 bits in the constant register can also be indicated.

The 4-bit operation code "op2" can be used to indicate any of the arithmetic logic operations or inter-register transfers that can be indicated by the operation code "op1", but can also be used to indicate a register-memory transfer operation such as an "ld" (load of one word data from memory into registers) or an "st" (store of one word data into memory from registers).

The first operation field 59 holds either a constant or a combination of (a) an operation code for indicating an operation (such as an arithmetic logic operation or inter-register transfer) that does not involve data transfer between the present processor and the periphery (memory), and (b) source and destination operands for the operation.

The second operation field 60 can hold the same content as the first operation field 59 described above, but can also alternatively hold a combination of (a) an operation code for indicating an operation (such as memory-register transfer) that involves data transfer between the present processor and the periphery (memory), and (b) operands for the operation.

The above assignment of different operation types to certain fields rests on the premises for the present von Neumann-type processor whereby it is not necessary to process two or more branch operations simultaneously, and that only one input/output port (the operand access unit 40 shown in FIG. 4) for transferring operands is provided between the present processor and the periphery (memory).

Hardware Construction of the Processor

The hardware construction of the present processor is described below.

FIG. 4 is a block diagram showing the hardware construction of the processor of the present invention.

As described above, this processor is a VLIW processor that can execute a maximum of three operations in parallel. The construction of the processor can be roughly divided into an instruction register 10, a decoder unit 20, and an execution unit 30.

The instruction register 10 is a 32-bit register that stores one instruction that has been sent from the instruction fetch unit 39.

The decoder unit 20 decodes the instruction held in the instruction register 10 and performs output on control lines to the execution unit 30 in accordance with the decoding result. This decoder unit 20 can itself be roughly divided into the format decoder 21 and the instruction decoder 22.

The instruction decoder 22 is composed of a branch decoder 23 that decodes the "cc" operation code held in the P1.0 field 12 and controls the PC unit 33 accordingly, a first operation decoder 24 that decodes the operation code held in the P2.0 field 13 and controls the first operation unit 37 accordingly, and a second operation decoder 25 that decodes the operation code held in the P3.0 field 16 and controls the second operation unit 38 and operand access unit 40 accordingly.

The format decoder 21 decodes the 4-bit format code held in the P0.0 field 11 to identify the instruction format of the instruction held in the instruction register 10 as one of the sixteen possible instruction formats shown in FIGS. 2B to 2D. In accordance with the decoding result, the format decoder 21 permits or prohibits decoding operations by the branch decoder 23, the first operation decoder 24, and the second operation decoder 25, and activates the constant register control unit 32 of the execution unit 30.

The format decoder 21, the branch decoder 23, the first operation decoder 24, and the second operation decoder 25 fundamentally decode one operation in one cycle and send control signals to the execution unit 30. Here, the 28-bit constant signal line 26 that connects the instruction register 10 with the execution unit 30 is a bus for transferring constants and operands located in the instruction register 10 to the execution unit 30.

The execution unit 30 operates according to the decoding result of the decoder unit 20 and is a circuit that is capable of executing a maximum of three operations in parallel. This execution unit 30 is composed of an execution control unit 31, a PC unit 33, a register set 34, a first operation unit 37, a second operation unit 38, an instruction fetch unit 39, and an operand access unit 40. Out of the components in the execution unit 30, the constructions of the constant register control unit 32, the PC unit 33, and the constant register 36 are shown in greater detail in the other drawings.

The execution control unit 31 refers in general to the control circuits and wiring for controlling the components numbered 33 to 40 in the execution unit 30 according to the decoding result of the decoder unit 20. This execution control unit 31 includes the components that are normally provided in a processor, such as circuits for timing control, operation permission/prohibition control, status management, and interruption control, as well as the constant register control unit 32 which is a characteristic component of the present processor. The constant register control unit 32 performs control so that a 4- or 16-bit constant "const" held in the instruction register 10 is stored in the constant register 36 based on indications given by the format decoder 21.

The PC (Program Counter) unit 33 operates under the control of the branch decoder 23, and outputs the address in an external memory (not illustrated) of the next instruction to be decoded and executed to the instruction fetch unit 39.

The instruction fetch unit 39 fetches an instruction block from the external memory (not illustrated) via a 32-bit IA (Instruction Address) bus and a 32-bit ID (Instruction Data) bus. The instruction fetch unit 39 stores the fetched instruction block in an internal instruction cache and supplies the instruction which corresponds to the address outputted by the PC unit 33 to the instruction register 10.

The register set 34 is composed of sixteen 32-bit general registers 35, one 32-bit constant register 36, and a constant register output unit 41. In accordance with the decoding results of the first operation decoder 24 and the second operation decoder 25, the values which are stored in these seventeen registers 35 and 36 are transferred to the first operation unit 37 and the second operation unit 38 where the values are used in operations or alternatively are allowed to pass, before being sent to the register set 34 or the operand access unit 40. Here, in addition to being used in the operations performed by the first operation unit 37 and the second operation unit 38, the value stored in the constant register 36 can also be transferred to the PC unit 33, where it is used to generate an effective address that is used as a branch destination.

In accordance with the control signals from the format decoder 21, the constant register output unit 41 outputs the constant stored in the constant register 36 as it is or outputs a constant given by linking the stored constant and constants in the instruction register 10.

The first operation unit 37 internally includes an ALU (Arithmetic Logic Unit) for performing arithmetic logic operations on two 32-bit sets of data and a multiplier for performing multiplications on two 32-bit sets of data. This first operation unit 37 is capable of executing two types of operation (namely, arithmetic logic operations, and inter-register transfer operations) under the control of the first operation decoder 24.

The second operation unit 38 internally includes an ALU for performing arithmetic logic operations on two 32-bit sets of data and a multiplier for performing multiplications on two 32-bit sets of data, in the same way as the first operation unit 37. This second operation unit 38 is capable of executing two types of operation (namely, arithmetic logic operations, and inter-register transfer operations) under the control of the second operation decoder 25.

The operand access unit 40 operates under the control of the second operation decoder 25 and is a circuit that transfers operands between the register set 34 and the external memory (not illustrated). The operand access unit 40 internally includes a buffer for storing operands and operand addresses. As a specific example, when the operation code "ld" is in the P3.1 field 16 of the instruction register 10, one word of data that is located in the external memory is loaded via the operand access unit 40 into one of the registers in the register set 34. When the operation code "st" is present, meanwhile, the stored value of one of the registers in the register set 34 is stored in the external memory.

The PC unit 33, the register set 34, the first operation unit 37, the second operation unit 38, and the operand access unit 40 are connected by internal buses (the L1 bus, the R1 bus, the L2 bus, the R2 bus, the D1 bus, and the D2 bus) as shown in FIG. 4. Here, the L1 bus and the R1 bus are each connected to a respective one of the two input ports of the first operation unit 37, the L2 bus and the R2 bus are each connected to a respective one of the two input ports of the second operation unit 38, and the D1 bus and the D2 bus are respectively connected to an output port of the first operation unit 37 and the second operation unit 38.

Detailed Construction of the Constant Register 36 and its Periphery

The following is a detailed description of the construction of the constant register 36 and of the peripheral circuits.

Figure 5:
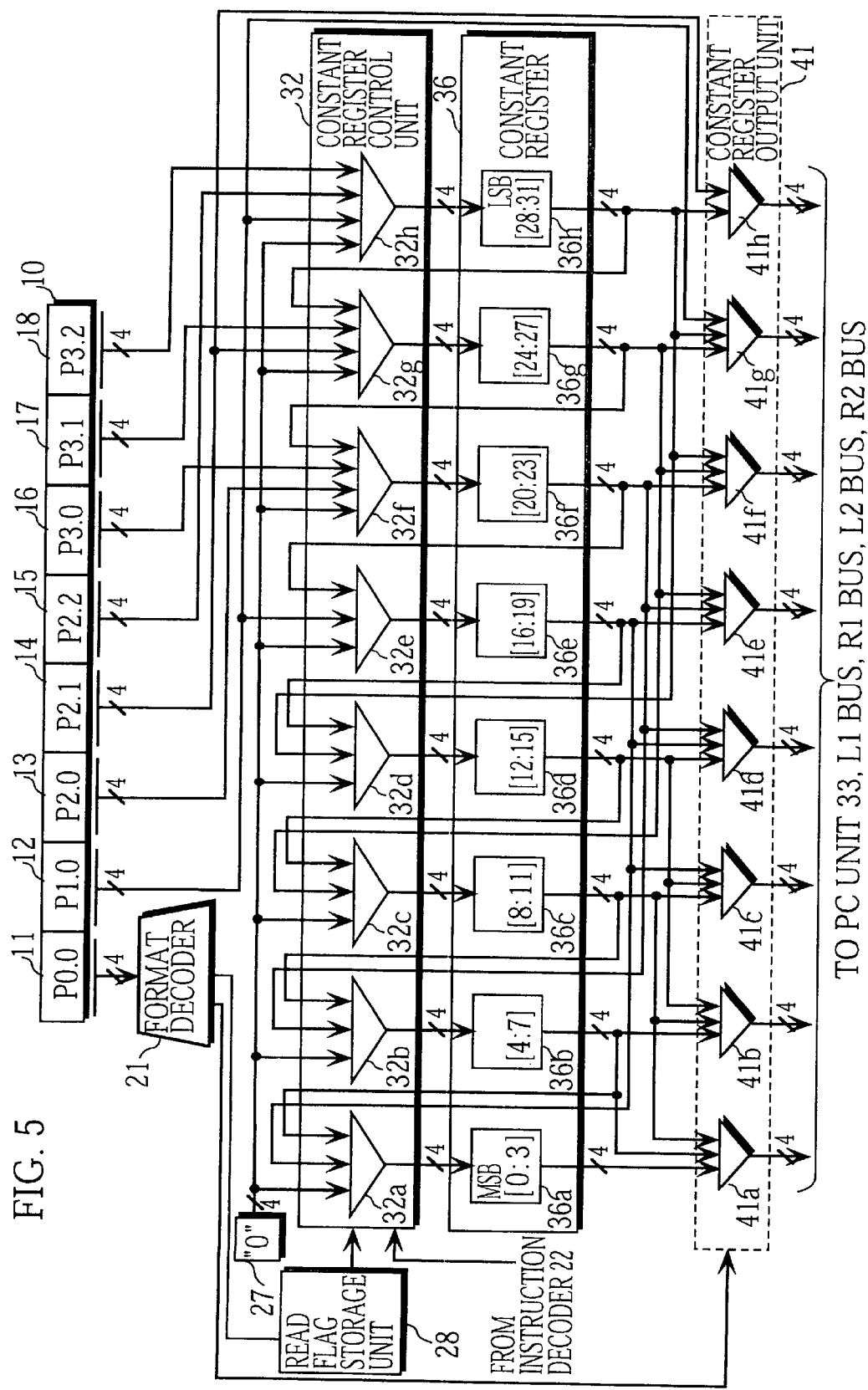
FIG. 5 is a block diagram showing the detailed construction of the constant register 36 of the present processor and the peripheral circuits.

FIG. 5 is a block diagram showing the detailed construction of the constant register 36 and of the peripheral circuits. Note here that the fixed value ("0") 27 in the drawing refers to fixed wiring for four signal lines carrying the constant "0".

The constant register control unit 32 is composed of five 3-input selectors 32a–32e and three 4-input selectors 32f–32h, while the constant register 36 is composed of eight 4-bit registers 36a–36h. Here, each set of input and output data is 4-bit parallel data.

Figure 6:
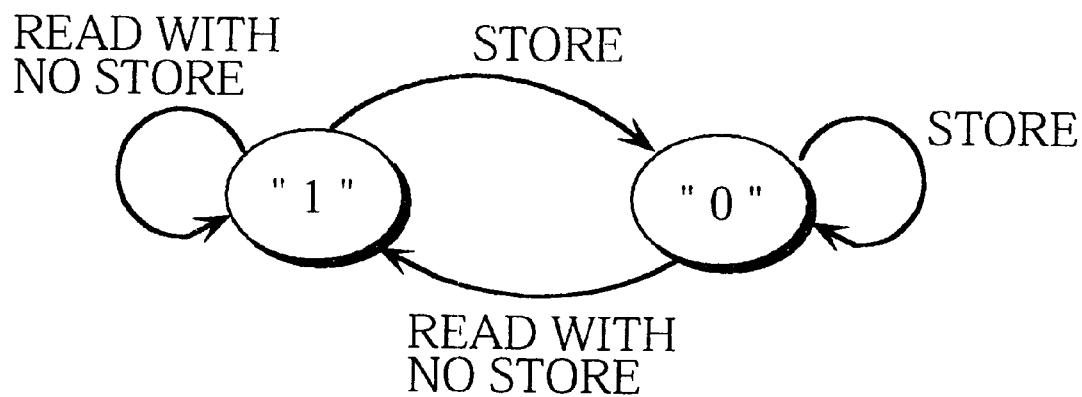
FIG. 6 is a state transition figure showing the changes in the value of the read flag storage unit 28.

The read flag storage unit 28 is used when judging whether to clear the stored value of the constant register 36. FIG. 6 is a state transition figure showing the changes in the value of the read flag storage unit 28. The value of the read flag storage unit 28 is set at "1" when the stored value of the constant register 36 has been read but the storage of a constant into the constant register 36 has not been performed. When the value of the read flag storage unit 28 is "1" and an operation indicating the storage of a constant is specified, the constant register control unit 490 performs control so that the stored value of the constant register 36 is cleared before the new constant is stored. After this, the value of the read flag storage unit 28 is set at "0".

In accordance with control signals from the format decoder 21 and the instruction decoder 22, the constant register control unit 32 controls the eight input selectors 32a–32h so that a constant stored in the instruction register 10 is stored in the constant register 36 according to one of the eight storage methods given below.

FIGS. 7A to 7H show the eight possible storage methods in the present embodiment.

FIG. 7A shows a storage method for when the format decoder 21 detects that the value stored in the P0.0 field 11 is "0" or "1" and the value of the read flag storage unit 28 is "0". This equates to the case when only a 4-bit constant located in the P1.0 field 12 is stored into the constant register 36.

More specifically, the data that is stored in the constant register 36 is shifted upwards (to the left in FIG. 7A) in 4-bit units and the 4-bit constant stored in the P1.0 field 12 of the instruction register 10 is stored into the lowest-order 4-bit register 36h of the constant register 36.

FIG. 7B shows a storage method for when the format decoder 21 detects that the value stored in the P0.0 field 11 is "0" or "1" and the value of the read flag storage unit 28 is "1". This equates to the case when the content of the constant register 36 is cleared to zero and only a 4-bit constant located in the P1.0 field 12 is stored into the constant register 36.

More specifically, the 4-bit constant held in the P1.0 field 12 is stored into the lowest-order 4-bit register 36h of the constant register 36 and "0"s are simultaneously stored into the remaining 4-bit registers 36a to 36g.

FIG. 7C shows a storage method for when the format decoder 21 detects that the value stored in the P0.0 field 11 is "4" and the value of the read flag storage unit 28 is "0". This equates to the case when a 16-bit constant located between the P1.0 field 12 and the P2.2 field 15 is stored in the constant register 36.

More specifically, data that is stored in the lower 4-bit registers 36e–36h of the constant register 36 is shifted to the upper 4-bit registers 36a–36d and the 16-bit constant located between the P1.0 field 12 and the P2.2 field 15 of the instruction register 10 is stored into the lower 4-bit registers 36e–36h of the constant register 36.

FIG. 7D shows a storage method for when the format decoder 21 detects that the value stored in the P0.0 field 11 is "4" and the value of the read flag storage unit 28 is "1". This equates to the case when the content of the constant register 36 is cleared to zero and a 16-bit constant located between the P1.0 field 12 and the P2.2 field 15 is stored into the constant register 36.

More specifically, the 16-bit constant held between the P1.0 field 12 and the P2.2 field 15 of the instruction register 10 is stored into the lower 4-bit registers 36e–36h of the constant register 36 and "0"s are stored into the remaining 4-bit registers 36a–36d.

FIG. 7E shows a storage method for when the format decoder 21 detects that the value stored in the P0.0 field 11 is "5" and the value of the read flag storage unit 28 is "0". This equates to the case when a 16-bit constant located at the P1.0 field 12 and between the P3.0 field 16 and the P3.2 field 18 is stored into the constant register 36.

More specifically, data that is stored in the lower 4-bit registers 36e–36h of the constant register 36 is shifted to the upper 4-bit registers 36a–36d and the 16-bit constant held in the P1.0 field 12 and between the P3.0 field 16 and the P3.2 field 18 is stored into the lower 4-bit registers 36e–36h of the constant register 36.

FIG. 7F shows a storage method for when the format decoder 21 detects that the value stored in the P0.0 field 11 is "5" and the value of the read flag storage unit 28 is "1". This equates to the case when the content of the constant register 36 is cleared to zero and a 16-bit constant located at the P1.0 field 12 and between the P3.0 field 16 and the P3.2 field 18 is stored in the constant register 36.

More specifically, the 16-bit constant held in the P1.0 field 12 and between the P3.0 field 16 and the P3.2 field 18 is stored in the lower 4-bit registers 36e–36h of the constant register 36 and "0"s are stored in the remaining 4-bit registers 36a–36d.

FIG. 7G shows a storage method for when the first operation decoder 24 detects a "setl4" operation. This equates to the case when only the lowest 4 bits of the current value stored in the constant register 36 are changed. More specifically, the data stored in the constant register 36 is not shifted and a 4-bit constant held in the P2.1 field is stored in the lowest-order 4-bit register 36h of the constant register 36.

FIG. 7H shows a storage method for when the second operation decoder 25 detects a "setl4" operation. This equates to the case when only the lowest 4 bits of the current value stored in the constant register 36 are changed. More specifically, the data stored in the constant register 36 is not shifted and a 4-bit constant held in the P3.1 field is stored in the lowest-order 4-bit register 36h of the constant register 36.

As described above, when the value in the P0.0 field 11 of the instruction register 10 is "0", "1", "4", or "5" and the value of the read flag is "0", the constant that is already stored in the constant register 36 is shifted and a new value is stored. When the value in the P0.0 field 11 of the instruction register 10 is "0", "1", "4", or "5" and the value of the read flag is "1", the content of the constant register 36 is cleared to zero and a new value is stored. When the "setl4" operation is indicated, only the content of the lowest-order 4-bit register of the constant register 36 is changed and the contents of the remaining 4-bit registers are maintained as they are. Note that the "setl4" operation can be arranged in either operation code "op1" or "op2", with the contents of the corresponding "Rd1" or the "Rd2" being ignored in such case.

By using the "setl4" for changing only the lower bits of the constant register 36, when constants that should be used for operations only differ in their lower bits, the same bits of the constants do not need to be reset for each operation, enabling the same higher bits of the constant register 36 to be reused.

FIGS. 8A to 8F show the changes in the stored values of the constant register 36 and the read flag storage unit 28.

FIG. 8A shows the content of the constant register 36 and the read flag storage unit 28 immediately after the constant "0x87654321" has been read from the constant register 36, while FIGS. 8B to 8E show the content of the constant register 36 and the read flag storage unit 28 immediately after the 4-bit constants "0x8", "0x7", "0x6", and "0x5" have successively been stored in the constant register 36. FIG. 8F, meanwhile, shows the content of the constant register 36 and the read flag storage unit 28 immediately after the value "0x00008765" stored in FIG. 8E has been read from the constant register 36.

As described above, the read flag storage unit 28 monitors the need to clear the content of the constant register 36, so that when a constant is divided and split between a plurality of instructions, the constant can be accumulated in the constant register 36 and so restored to its original value with a zero extension.

The zero extension process mentioned here is a process which, when the number of valid bits in a value is less a predetermined number of bits, fills the blank upper bit positions with "0"s.

By providing a read flag storage unit 28 in this way, it is possible to judge whether a zero clear is required when storing a new constant, so that it is no longer necessary to clear the stored value of the constant register 36 immediately after this value is read. By doing so, the stored value of the constant register 36 can be reused in its entirety, as described below.

The processor of the present embodiment performs the following operations for the instruction formats shown in FIGS. 2B to 2D in accordance with the value of the read flag storage unit 28. It should be noted here that the value of the read flag storage unit 28 of the present processor is set at "1" as its initial state.

Processing for the Format Code (Value in the P0.0 Field 11) "0"

(1) When the value of the read flag storage unit 28 is "1"

First, the operation "op1" specified by the first operation field 59 is executed. When doing so, the source operand is "Rs1" and the destination operand is "Rd1".

At the same time, the operation specified by the second operation field 60 is executed. When doing so, the source operand is "Rs2" and the destination operand is "Rd2".

Next, the constant "const" specified by the P1.0 field 52 is stored in the area 36h of the constant register 36, and the areas 36a to 36g are cleared to zero. After this, the stored value of the read flag storage unit 28 is set at "0".

(2) When the value of the read flag storage unit 28 is "0"

First, the operation "op1" specified by the first operation field 59 is executed. When doing so, the source operand is "Rs1" and the destination operand is "Rd1".

At the same time, the operation "op2" specified by the second operation field 60 is executed. When doing so, the source operand is "Rs2" and the destination operand is "Rd2".

Next, the value in the areas 36b to 36h of the constant register 36 is shifted 4 bits to the upper bit positions so as to be stored in the areas 36a to 36g. The constant "const" specified by the P1.0 field 52 is then stored in the area 36h of the constant register 36. The value of the read flag storage unit 28 is kept at "0".

Processing for the Format Code "1"

(1) When the value of the read flag storage unit 28 is "1"

First, the operation "op1" specified by the first operation field 59 is executed. When doing so, the destination operand is "Rd1" and the source operand is the 4-bit constant "const1" that is specified by the P2.1 field 54.

At the same time, the operation "op2" specified by the second operation field 60 is executed. When doing so, the source operand is "Rs2" and the destination operand is "Rd2".

Next, the constant "const" specified by the P1.0 field 52 is stored in the area 36h of the constant register 36, and the areas 36a to 36g are cleared to zero. After this, the stored value of the read flag storage unit 28 is set at "0".

(2) When the value of the read flag storage unit 28 is "0"

First, the operation "op1" specified by the first operation field 59 is executed. When doing so, the destination operand is "Rd1" and the source operand is a 32-bit constant obtained by linking the stored value of the 36b to 36h areas of the constant register 36 with the 4-bit constant "const1" that is specified by the P2.1 field 54. After the content of the constant register 36 has been read, the read flag storage unit 28 is set at "1".

At the same time, the operation "op2" specified by the second operation field 60 is executed. When doing so, the source operand is "Rs2" and the destination operand is "Rd2".

Next, since the value of the read flag storage unit 28 has been set at "1", the constant "const" specified by the P1.0 field 52 is stored in the area 36h of the constant register 36, and the areas 36a to 36g are cleared to zero. After this, the stored value of the read flag storage unit 28 is set at "0".

Processing for the Format Code "2"

(1) When the value of the read flag storage unit 28 is "1"

First, the operation "op1" specified by the first operation field 59 is executed. When doing so, the source operand is "Rs1" and the destination operand is "Rd1".

At the same time, the operation "op2" specified by the second operation field 60 is executed. When doing so, the source operand is "Rs2" and the destination operand is "Rd2".

Next, it is judged whether the branch condition of the operation "cc" specified by the P1.0 field 52 is satisfied. If so, the PC unit 33 finds the branch destination address from the content of the constant register 36 and stores the result in the PC (program counter).

The value of the read flag storage unit 28 is kept at "1".

(2) When the value of the read flag storage unit 28 is "0"

First, the operation "op1" specified by the first operation field 59 is executed. When doing so, the source operand is "Rs1" and the destination operand is "Rd1".

At the same time, the operation "op2" specified by the second operation field 60 is executed. When doing so, the source operand is "Rs2" and the destination operand is "Rd2".

Next, it is judged whether the branch condition of the operation "cc" specified by the P1.0 field 52 is satisfied. If so, the PC unit 33 finds the branch destination address from the content of the constant register 36 and stores the result in the PC (program counter).

The value of the read flag storage unit 28 is set at "1".

Processing for the Format Code "3"

(1) When the value of the read flag storage unit 28 is "1"

First, the operation "op1" specified by the first operation field 59 is executed. When doing so, the destination operand is "Rd1" and the source operand is the 4-bit constant "const1" that is specified by the P2.1 field 54.

At the same time, the operation "op2" specified by the second operation field 60 is executed. When doing so, the source operand is "Rs2" and the destination operand is "Rd2".

Next, it is judged whether the branch condition of the operation "cc" specified by the P1.0 field 52 is satisfied. If so, the PC unit 33 finds the branch destination address from the content of the constant register 36 and stores the result in the PC (program counter).

The value of the read flag storage unit 28 is kept at "1".

(2) When the value of the read flag storage unit 28 is "0"

First, the operation "op1" specified by the first operation field 59 is executed. When doing so, the destination operand is "Rd1" and the source operand is the 4-bit constant "const1" that is specified by the P2.1 field 54.

At the same time, the operation "op2" specified by the second operation field 60 is executed. When doing so, the source operand is "Rs2" and the destination operand is "Rd2".

Next, it is judged whether the branch condition of the operation "cc" specified by the P1.0 field 52 is satisfied. If so, the PC unit 33 finds the branch destination address from the content of the constant register 36 and stores the result in the PC (program counter).

The value of the read flag storage unit 28 is set at "1".

Processing for the format code "4"

(1) When the value of the read flag storage unit 28 is "1"

First, the operation "op2" specified by the second operation field 60 is executed. When doing so, the source operand is "Rs2" and the destination operand is "Rd2".

Next, the 16-bit constant "const" that is specified between the P1.0 field 52 and the P2.2 field 55 is stored in the 16-bit area 36e–36h of the constant register 36 and the content of the areas 36a–36d is cleared to zero. After this, the value of the read flag storage unit 28 is set at "0".

(2) When the value of the read flag storage unit 28 is "0"

First, the operation "op2" specified by the second operation field 60 is executed. When doing so, the source operand is "Rs2" and the destination operand is "Rd2".

Next, the value stored in the lower sixteen bits 36e–36h of the constant register 36 is shifted to the higher sixteen bits 36a–36d, and the 16-bit constant "const" that is specified between the P1.0 field 52 and the P2.2 field 55 is stored in the lower sixteen bits 36e–36h of the constant register 36. After this, the value of the read flag storage unit 28 is kept at "0".

Processing for the Format Code "5"

(1) When the value of the read flag storage unit 28 is "1"

First, the operation "op1" specified by the first operation field 59 is executed. When doing so, the source operand is "Rs1" and the destination operand is "Rd1".

Next, the 16-bit constant "const" that is specified by the P1.0 field 52 and the P3.0 field 56-P3.2 field 58 is stored in the 16-bit area 36e–36h of the constant register 36 and the content of the areas 36a–36d is cleared to zero. After this, the value of the read flag storage unit 28 is set at "0".

(2) When the value of the read flag storage unit 28 is "0"

First, the operation "op1" specified by the first operation field 59 is executed. When doing so, the source operand is "Rs1" and the destination operand is "Rd1".

Next, the value stored in the lower sixteen bits 36e–36h of the constant register 36 is shifted to the higher sixteen bits 36a–36d, and the 16-bit constant "const" that is specified by the P1.0 field 52 and the P3.0 field 56–P3.2 field 58 is stored in the lower sixteen bits 36e–36h of the constant register 36. After this, the value of the read flag storage unit 28 is kept at "0".

Processing for the Format Code "6"

(1) When the value of the read flag storage unit 28 is "1"

First, the operation "op1" specified by the first operation field 59 is executed. When doing so, the destination operand is "Rd1" and the source operand is the 8-bit constant that is obtained by linking the 4-bit constant "const1" specified by the P1.0 field 52 and the 4-bit constant "const1" specified by the P2.1 field 54.

At the same time, the operation "op2" specified by the second operation field 60 is executed. When doing so, the source operand is "Rs2" and the destination operand is "Rd2".

(2) When the value of the read flag storage unit 28 is "0"

First, the operation "op1" specified by the first operation field 59 is executed. When doing so, the destination operand is "Rd1" and the source operand is the 32-bit constant that is obtained by linking the value stored in the lower 24-bit area 36c–36h of the constant register 36 with the 4-bit constant "const1" specified by the P1.0 field 52 and the 4-bit constant "const1" specified by the P2.1 field 54. Since the content of the constant register 36 has been read, the value of the read flag storage unit 28 is set at "1".

At the same time, the operation "op2" specified by the second operation field 60 is executed. When doing so, the source operand is "Rs2" and the destination operand is "Rd2".

Processing for the Format Code "7"

(1) When the value of the read flag storage unit 28 is "1"

First, the operation "op1" specified by the first operation field 59 is executed. When doing so, the source operand is "Rs1" and the destination operand is "Rd1".

At the same time, the operation "op2" specified by the second operation field 60 is executed. When doing so, the destination operand is "Rd2" and the source operand is the 8-bit constant that is obtained by linking the 4-bit constant "const" specified by the P1.0 field 52 and the 4-bit constant "const2" specified by the P3.1 field 57.

(2) When the value of the read flag storage unit 28 is "0"

First, the operation "op1" specified by the first operation field 59 is executed. When doing so, the source operand is "Rs1" and the destination operand is "Rd1".

At the same time, the operation "op2" specified by the second operation field 60 is executed. When doing so, the destination operand is "Rd2" and the source operand is the 32-bit constant that is obtained by linking the value stored in the lower 24-bit area 36c–36h of the constant register 36 with the 4-bit constant "const2" specified by the P1.0 field 52 and the 4-bit constant "const2" specified by the P3.1 field 57. Since the content of the constant register 36 has been read, the value of the read flag storage unit 28 is set at "1".

Processing for the format code "8"

(1) When the value of the read flag storage unit 28 is "1"

First, the operation "op1" specified by the first operation field 59 is executed. When doing so, the destination operand is "Rd1" and the source operand is the 8-bit constant given by linking the 4-bit constant "const1" in the P1.0 field 52 and the 4-bit constant "const1" in the P2.1 field 54.

At the same time, the operation "op2" specified by the second operation field 60 is executed. When doing so, the destination operand is "Rd2" and the source operand is the 4-bit constant "const2" specified by the P3.1 field 57.

(2) When the value of the read flag storage unit 28 is "0"

First, the operation "op1" specified by the first operation field 59 is executed. When doing so, the destination operand is "Rd1" and the source operand is the 32-bit constant that is obtained by linking the value stored in the lower 24-bit area of the constant register 36 with the 4-bit constant "const1" specified by the P1.0 field 52 and the 4-bit constant "const1" specified by the P2.1 field 54. Since the content of the constant register 36 has been read, the value of the read flag storage unit 28 is set at "1".

At the same time, the operation "op2" specified by the second operation field 60 is executed. When doing so, the destination operand is "Rd2" and the source operand is the 4-bit constant "const2" specified by the P3.1 field 57.

Processing for the Format Code "9"

(1) When the value of the read flag storage unit 28 is "1"

First, the operation "op1" specified by the first operation field 59 is executed. When doing so, the destination operand is "Rd1" and the source operand is the 4-bit constant "const1" that is specified by the P2.1 field 54.

At the same time, the operation "op2" specified by the second operation field 60 is executed. When doing so, the destination operand is "Rd2" and the source operand is the 8-bit constant given by linking the 4-bit constant "const2" specified by the P1.0 field 52 with the 4-bit constant "const2" specified by the P3.1 field 57.

(2) When the value of the read flag storage unit 28 is "0"

First, the operation "op1" specified by the first operation field 59 is executed. When doing so, the destination operand is "Rd1" and the source operand is the 32-bit constant obtained by linking the lower 28-bit area 36b–36h of the constant register 36 with the 4-bit constant "const1" that is specified by the P2.1 field 54. Since the content of the constant register 36 has been read, the read flag storage unit 28 is set at "1".

At the same time, the operation "op2" specified by the second operation field 60 is executed. When doing so, the destination operand is "Rd2" and the source operand is the 8-bit constant given by linking the 4-bit constant "const2" specified by the P1.0 field 52 with the 4-bit constant "const2" specified by the P3.1 field 57.

Processing for the Format Code "A"

(1) When the value of the read flag storage unit 28 is "1"

First, the operation "op2" specified by the second operation field 60 is executed. When doing so, the destination operand is "Rd1" and the source operand is the 16-bit constant that is given by linking the 12-bit constant "const2" that is specified by the P2.0 field 53 to P2.2 field 55 with the 4-bit constant "const2" that is specified by the P3.1 field 57.

After this, it is judged whether the branch condition of the "cc" operation specified by the P1.0 field 52 is satisfied. If so, the PC unit 33 finds the branch destination address from the content of the constant register 36 and stores the result in the PC (program counter).

The stored value of the read flag storage unit 28 is kept at "1".

(2) When the value of the read flag storage unit 28 is "0"

First, the operation "op2" specified by the second operation field 60 is executed. When doing so, the destination operand is "Rd1" and the source operand is the 16-bit constant that is given by linking the 12-bit constant "const2" that is specified by the P2.0 field 53 to P2.2 field 55 with the 4-bit constant "const2" that is specified by the P3.1 field 57.

After this, it is judged whether the branch condition of the "cc" operation specified by the P1.0 field 52 is satisfied. If so, the PC unit 33 finds the branch destination address from the content of the constant register 36 and stores the result in the PC (program counter).

The stored value of the read flag storage unit 28 is then set at "1".

Processing for the Format Code "B"

This instruction only indicates one instruction, and the content of the constant register 36 is not referred to, regardless of the value of the read flag storage unit 28. The operand of the operation is the 24 bit constant given by linking the 16-bit constant "const2" specified by the P1.0 field 52 to P2.2 field 55 with the 8-bit constant "const2" specified by the P3.1 field 57 to the P3.2 field 58.

The format codes "C" to "F" are "reserved" for extension instructions or the like.

With the present processor, a maximum of three operations can be specified with a single instruction. As can be seen from the instruction formats for triple operations shown in FIG. 2B, the kind of triple operation is one of the following two combinations.

(1) One combination is composed of an operation for setting a 4-bit constant in the constant register 36 and two general operations (in the case of the format code "0" or "1").

(2) The other combination is composed of a branch operation using the value set in the constant register 36 as an absolute address or a relative address and two general operations (in the case of the format code "2" or "3").

As described above, although having only 32-bit length, instructions for the present processor can specify a maximum of three operations at a time, so that their field construction is highly efficient. The present processor is also characterized by processing where a value stored in the constant register 36 is read and, at the same time, the read constant is linked with constants specified by operation fields so that an operation is executed using an operand which is the linked constants.

The constant register output unit 41 includes seven 3-input selectors 41a–41g and a 2-input selector 41h. In accordance with control signals from the format decoder 21, the constant register output unit 41 controls the eight input selectors 41a–41h so that one of the following three types of processing is performed. For the first type of the processing, the constant held by the constant register 36 is output to the PC unit 33, L1 bus, R1 bus, L2 bus, or R2 bus. For the second type of the processing, the constant held by the constant register 36 is shifted upwards by 4 bits so that the 4–31 bits of the constant are shifted to the 0–27 bits of the constant register 36. The constant held by the P2.1 field 14 of the instruction register 10 is set in 28–31 bits and is linked with the shifted constant. The linked constants are output to the PC unit 33, L1 bus, R1 bus, L2 bus, or R2 bus. For the third type of the processing, the constant held by the constant register 36 is shifted upwards by 8 bits so that the 8–31 bits of the constant are shifted to the 0–23 bits of the constant register 36. The constant held by the P1.0 field 12 of the instruction register 10 is set in 24–27 bits and the constant held by the P2.1 field 14 is set in 28–31 bits and the constants are linked with the shifted constant. The linked constants are output to the PC unit 33, L1 bus, R1 bus, L2 bus, or R2 bus.

Detailed Construction of the PC Unit 33

The following is a detailed description of the construction of the PC unit 33.

FIG. 9 is a block diagram showing the construction of the PC unit 33 in detail. As shown in FIG. 9, the PC unit 33 is composed of a fixed value ("4") 33a, that is wiring which permanently carries the constant "4", a 2-input selector 33b, an adder 33c, a PC (Program Counter) 33d for storing an address of the next instruction to be decoded and executed, and a 2-input selector 33e.

In the PC unit 33, the selectors 33b and 33e operate in accordance with control signals from the decoder unit 20, so that the selector 33e outputs one of the following three types of values to the instruction fetch unit 39 as the effective address.

(1) A Value Where "4" is Added to the Content of the PC 33d

This corresponds to when no branch is taken and a next instruction is to be executed in order, which is to say, when the decoding result for a present instruction is that no branch operation is indicated. The reason "4" is added is that the length of one instruction is four bytes, which is to say, 32 bits.

(2) A Value Where the Content of the Constant Register 36 is Added to the Content of the PC 33d This corresponds to when the content of the constant register 36 is used as a relative address for branching, such as when the decoding result of the branch decoder 23 is that the P1.0 field 12 indicates a branch to a relative address.

(3) A Value Given as the Content of the Constant Register 36

This corresponds to when the content of the constant register 36 is used as an absolute address for branching, such as when the decoding result of the branch decoder 23 is that the P1.0 field 12 indicates a branch to an absolute address.

As described above, the PC unit 33 includes a specialized adder 33c, and is constructed to directly use the value stored by the constant register 36, so that branch execution control can be performed with the stored value of the constant register 36 as a relative address or an absolute address in parallel with and independent of the operations performed by the first operation unit 37 and the second operation unit 38.

Operation of the Processor

The following is a description of the operation of the present processor when decoding and executing specific operations.

Figure 10:
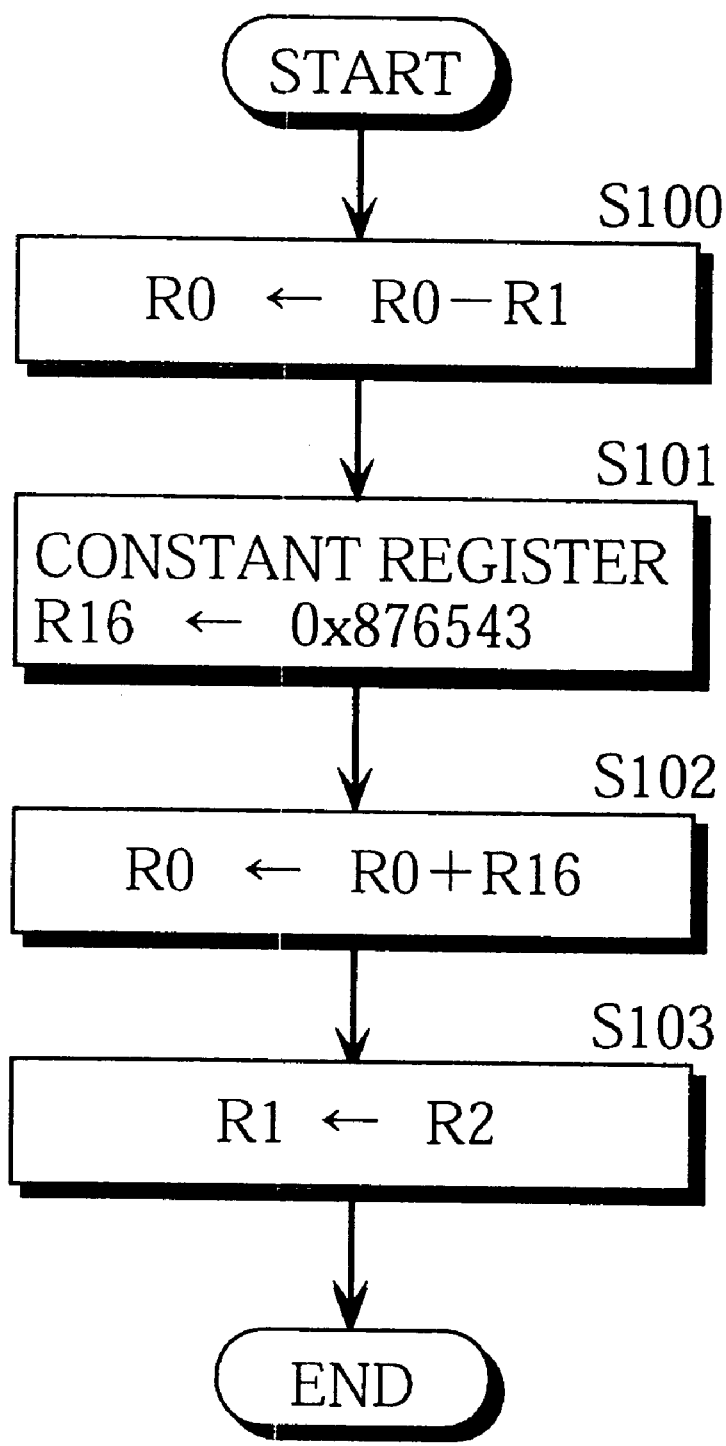
FIG. 10 is a flowchart showing an example of processing that handles a 24-bit constant.

FIG. 10 is a flowchart showing an example of a procedure that handles 24-bit constants.

First, the difference between the stored values of the registers R0 and R1 is found (step S100), the 24-bit constant "0x876543" (here "0x" represents hexadecimal) is then added to the found difference (steps S101, S102), and finally the value stored in the register R2 is transferred to the register R1 (step S103).

FIG. 11 shows an example of a program that has the present processor perform the procedure shown in FIG. 10.

The program is composed of the two instructions 71 and 72. In FIG. 11, one line corresponds to one instruction, and the content of each instruction is shown by mnemonics located in the separate fields of each instruction. In FIG. 11, the value of each constant is expressed in hexadecimal. Also, the legend fmtn (n=0–F)" shows the format code "n", while the legend "Rn (n=0–15)" shows the value stored in one of the registers in the register set 34.

Figure 12:
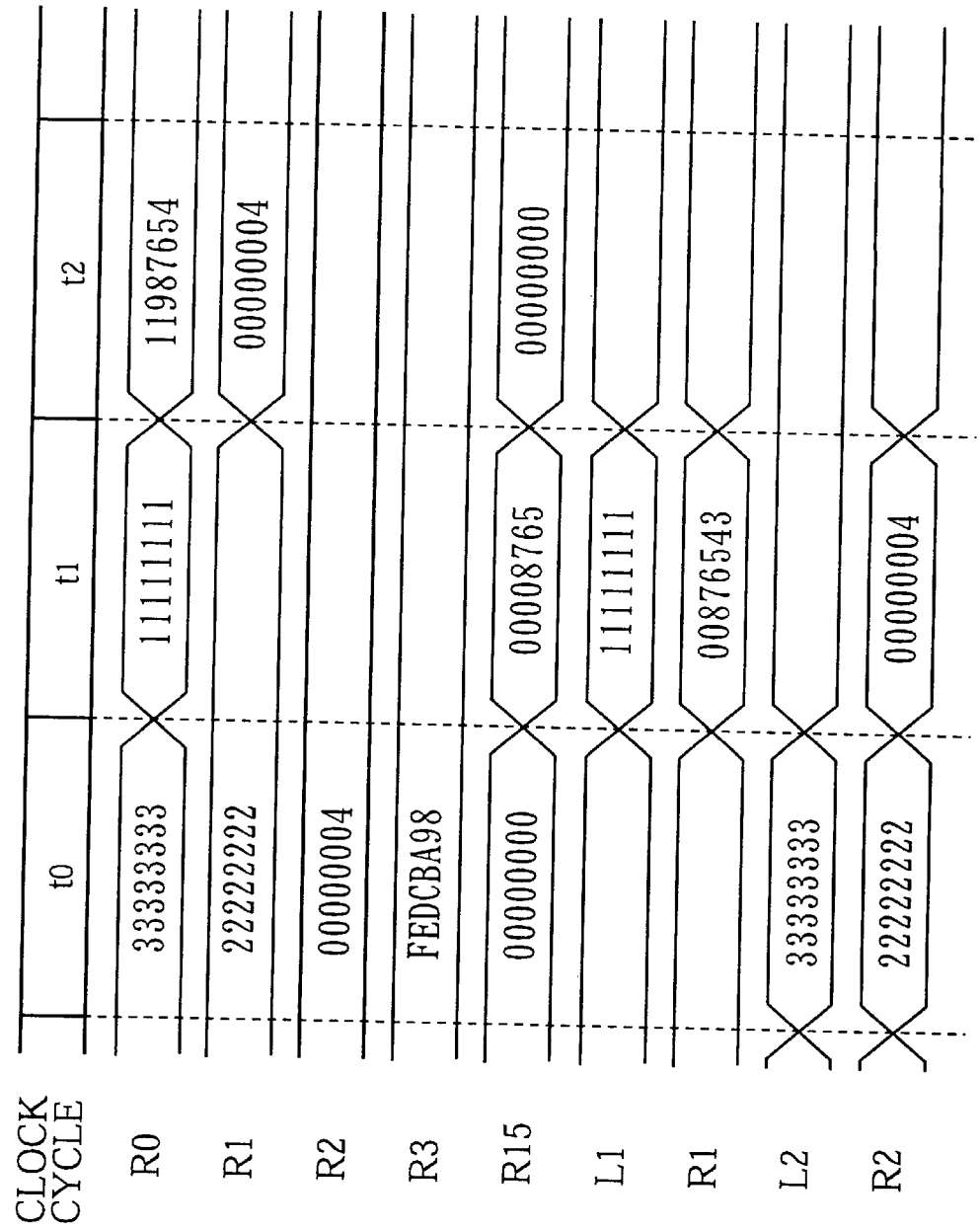
FIG. 12 is a timing chart showing the operation of the present processor when executing the program shown in FIG. 11.

FIG. 12 is a timing chart showing the operation of the present processor when executing the program shown in FIG. 11.

This FIG. 12 shows the clock cycles, the content of the general registers R0–R3 and the constant register R15, and the data that flows on the four buses L1, R1, L2, and R2.

The following is an explanation of the operation of the present processor for each of the instructions 71 and 72, with reference to FIGS. 2, 4, 5, 11 and 12.

As the initial states, the content of the general register R0 is "0x33333333", the content of the general register R1 "0x22222222", the content of the general register R2 "0x00000004", and the content of the general register R3 "0xFEDCBA98". As the initial setting, the constant register R15 is reset and the value of the read flag storage unit 28 is set at "1".

Instruction 71

After the instruction 71 has been loaded into the instruction register 10, the format decoder 21 judges from the value "fmt4" of the P0.0 field 11 in the instruction register 10 that the present instruction is a twin operation instruction with the format code "4", and so controls the execution unit 30 so that the two operations described below are executed in parallel.

1. First Operation

As shown in FIG. 2, in the twin operation instruction whose format code is "4", the value in the area between the P1.0 field 12 and the P2.2 field 15 represents a 16-bit constant (0x8765) so that the branch decoder 23 and the first operation decoder 24 are not used for this instruction. The constant register control unit 32 controls its eight internal selectors 32a–32h so that the 16-bit constant (0x8765) located between the P1.0 field 12 and the P2.2 field 15 is stored in the lower 16 bits of the constant register 36 according to the storage method shown in FIG. 7C. The upper 16 bits of the constant register 36 is cleared to zero and the value of the read flag storage unit 28 is set to "0".

In this example, the content of the register R15 changes from "0x0000000" to "0x00008765" as shown in the clock cycles t0–t1 in FIG. 12.

2. Second Operation

As shown in FIG. 2, in the twin operation instruction whose format code is "4", the value in the P3.0 field 16 represents the operation code "op2". The decode result of the value in the P3.0 field 16 by the second operation decoder 25 is, in this example, that the operation is "sub" (subtraction). The execution control unit 31 controls the second operation unit 38 to subtract the stored value of the general register R1 from that of the general register R0 and stores the result in the general register R0. In this example, the stored content of the general register R0 changes from the value "0x33333333" to the value "0x11111111" in the clock cycles t0–t1 shown in FIG. 12.

Instruction 72

Next, after the instruction 72 has been loaded into the instruction register 10, the format decoder 21 judges from the value "fmt6" of the P0.0 field 11 in the instruction register 10 that the present instruction is a twin operation instruction with the format code "6", and so controls the execution unit 30 so that the two operations described below are executed in parallel.

1. First Operation

As shown in FIG. 2, in the twin operation instruction with the format code "6", each value in the P1.0 field 12 and the P2.1 field 14 indicates one 4-bit constant (0x4 and 0x3) and therefore the branch decoder 23 is not used and the value in the P2.0 field 13 indicates the operation code "op1". In this case, the decode result of the value in the P2.0 field 13 by the first operation decoder 24 is that the operation is "add" (addition) and the value of the read flag storage unit 28 is "0". As a result, the execution control unit 31 controls the first operation unit 37 to add the content of the general register R0 to the value (0x00876543) obtained by linking the lower 24 bits in the constant register (0x008765) with the value in the P1.0 field 12 (0x4) and the P2.1 field 14 (0x3) and stores the addition result in the general register R0. After this, the value of the read flag storage unit 28 is set to "1".

In this example, the content of the general register R0 changes from "0x11111111" to "0x11987654" as shown in the clock cycles t1–t2 in FIG. 12.

2. Second Operation

As shown in FIG. 2, in the twin operation instruction with the format code "6", the value in the P3.0 field 16 indicates the operation code "op2". In this case, the decode result of the value in the P3.0 field 16 by the second operation decoder 25 is that the operation is "mov" (transfer of one word (32-bit) data). As a result, the execution control unit 31 controls the second operation unit 38 to allow the content of the general register R2 to pass as it is and stores the content in the general register R1.

As described above for the present processor, the 24-bit constant "0x876543" is split, is arranged into the two instructions 71–72, and is used by the second instruction 72. In this manner, the procedure shown in the flowchart in FIG. 10 is executed with the two instructions 71 and 72.

Comparison With a Processor Incapable of Using a Constant Stored in Constant Register and Constants Arranged in Instructions by Linking the Constants The following is a description of processing performed by a processor, which is incapable of using a constant stored in the constant register and constants arranged in instructions by linking the constants, (hereinafter referred to as a "comparison processor") for a program with the same processing content as shown in FIG. 10. The processing of this comparison processor is compared with that of the present invention.

FIG. 13 shows an example of a program to be executed by the comparison processor. This program has the same procedure as the flowchart shown in FIG. 10.

As can be seen by comparing FIG. 11 and FIG. 13, the program for the comparison processor shown in FIG. 13 includes one more instruction than the program for the processor of the present invention shown in FIG. 11.

This is because the comparison processor cannot link the pre-stored pieces of an operand with the remaining pieces of the operand directly specified by operations and use the linked operand. Therefore, the comparison processor requires the two instructions 73 and 74 for accumulating pieces of an operand and the instruction 75 for using the accumulated pieces. As a result, at least three instructions are necessary and the no-operation code "nop" needs to be inserted into the instructions.

As described above, with the processor of the present embodiment, a constant to be used as an operand is generated from constants accumulated in the constant register and constants specified by operations. At the same time, an operation is executed using the generated constant. As a result, the number of execution cycles can be reduced.

While the comparison processor explicitly specifies the constant register before executing an operation, the processor of the present embodiment judges from the value in the P0.0 field 11 ("fmt6") that the present instruction is the twin operation instruction with the format code "6" and the present instruction implicitly uses the constant register. As a result, code for explicitly specifying the constant register is not necessary for the present processor, so that the instruction length can be shortened.

Reread of Entire Value in Constant Register

FIG. 14 shows an example of the program including branch operations.

This program is composed of three instructions 76–78.

With this program, the 16-bit constant "0x1234" is set in the constant register 36 according to the storage method shown in FIG. 7C by the instruction 76, and the content of the constant register 36 is referred to and a branch operation is executed using the value (0x1234) as a relative address (displacement) by the operation code "eqi" in the instruction 77. After this, the value in the flag storage unit 28 is set to "1". The content of the constant register 36 is referred to again and a branch operation is executed using the value (0x1234) as a relative address by the operation code "gti" in the instruction 78. Note that the judgement for branch conditions is performed according to the results of a preceding "cmp" operation.

As described above, even if the value of the read flag storage unit 28 is set to "1", the content of the constant register 36 is not changed until an operation for storing a new constant in the constant register 36 is performed, so that the whole value stored in the constant register 36 can be repeatedly read and used.

As a result, when using the same constant for different operations, the constant does not need to be reset in the constant register 36 for each operation, reducing the number of execution cycles and instruction code size.

Reuse of a Part of Value in Constant Register

FIG. 15 shows an example of the program including the "setl4" operation shown in FIGS. 7G and 7H described above.

This program is composed of three instructions 79–81.

With this program, the 16-bit constant "0x3210" is set in the constant register 36 according to the storage method shown in FIG. 7C by the instruction 79, and the content of the constant register 36 is referred to and a branch operation is executed using the value (0x3210) as a relative address (displacement) by the operation code "eqi" in the instruction 80. The 4-bit constant "0xC" is set in the lower 4 bits of the constant register 36 according to the storage method shown in FIG. 7H by the "setl4" operation in the second operation field 60 of the instruction 80. At this time, the stored value in the constant register 36 is "0x321C". The content of the constant register 36 is referred to and a branch operation is executed using the value (0x321C) as a relative address by the "gti" operation in the instruction 81. Note that the judgement for branch conditions is performed according to the results of a preceding "cmp" operation.

As described above, when a constant that is partly different from a previous constant is used for the next operation, an operation code such as "setl4" for changing only a part of the value in the constant register 36 is used, since the resetting of only the different part is sufficient for the operation.

As a result, when using constants which differ from one another only in a part, the entire constant does not need to be set in the constant register 36, reducing the number of execution cycles and instruction code size.

Modifications of the Peripheral Circuit of the Constant Register 36

The following is a description of a modification to the peripheral circuit of the constant register 36 shown in FIG. 5.

First Modification

The above-described processor for reusing a part of the value in the constant register includes an operation for changing only the lower 4 bits of the constant register 36 so that the processor can reuse the value in the unchanged upper bits. The following description concerns a processor which can change any number of bits and reuse these unchanged bits.

While the above-described processor links a constant accumulated in the constant register with a 4- or 8-bit constant specified by an operation, the processor described below can freely link constants accumulated in the constant register and constants specified by operations in 4-bit units.

Figure 16:
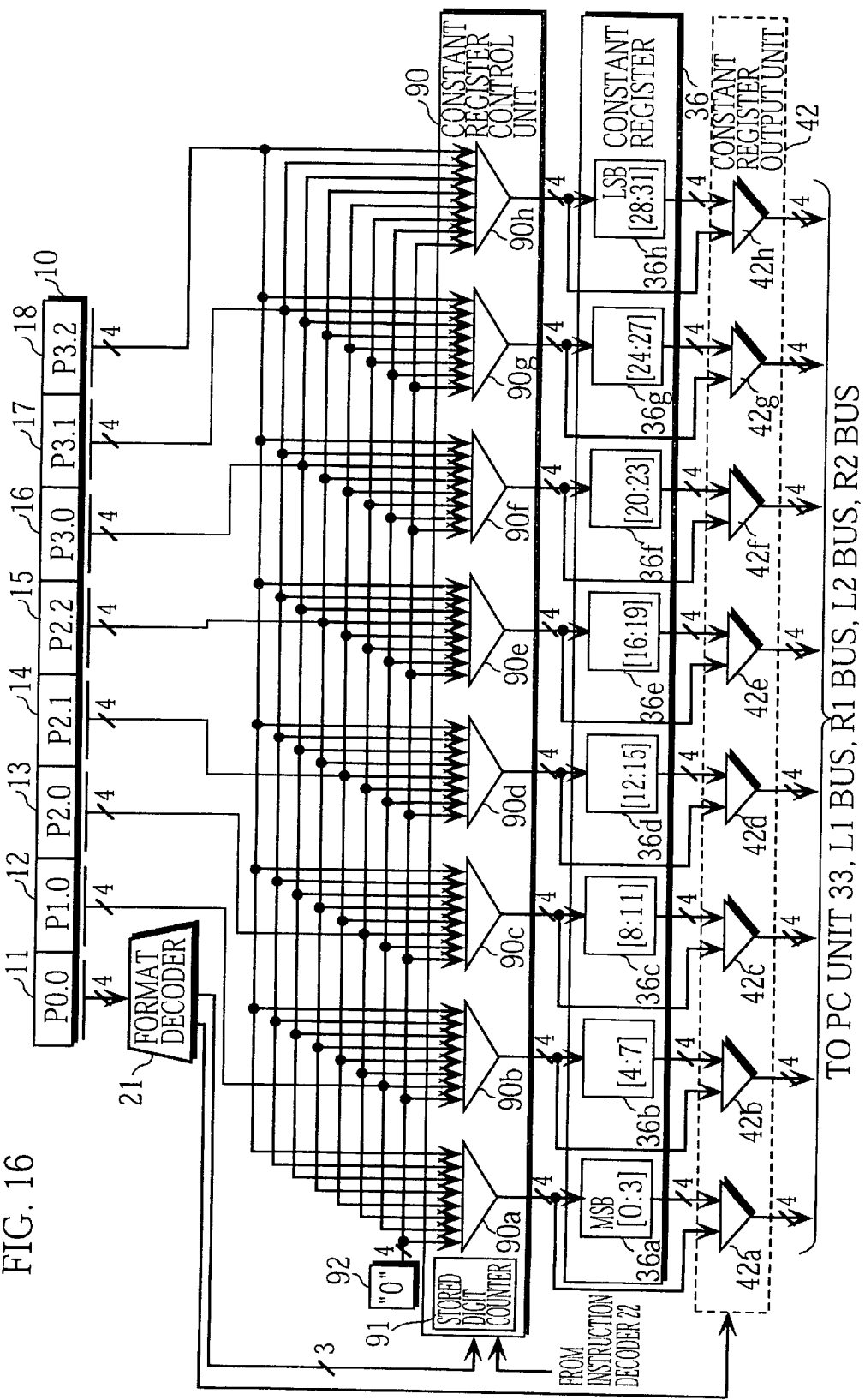
FIG. 16 is a block diagram showing the construction of the peripheral circuit of the constant register 36 in the first modification and its connection pattern.

FIG. 16 is a block diagram showing the construction of a peripheral circuit of the constant register 36 in the present modification and its connection pattern.

The processor of the present modification is different from the above-described processor in that the constant register control unit 32 is replaced by the constant register control unit 90 and the constant register output unit 41 is replaced by the constant register output unit 42.

While the constant register control unit 32 shown in FIG. 5 has the constant register 36 operate as a shift register, the constant register control unit 90 shown in FIG. 16 differs in having the constant register 36 function as a parallel input register. More specifically, the differences lie in the connections between the constant register control unit 90 and the format decoder 21 and in the construction of the constant register control unit 90.

The constant register control unit 90 is composed of a stored digit counter 91 and eight input selectors 90a to 90h. The stored digit counter 91 is a 3-bit counter which shows the number of valid bits in the constant which is presently stored in the constant register 36 in nibble (4-bit) units.

On receiving an instruction from the format decoder 21 to store a constant located in the instruction register 10 into the constant register 36, the constant register control unit 90 refers to the present value of the stored digit counter 91 so that it can store the constant taken from the instruction register 10 at the appropriate position in the constant register 36. The constant register control unit 90 then updates the value stored by the stored digit counter 91.

The constant register control unit 90 differs from the constant register control unit 32 in that a constant arranged in an instruction to be executed afterward is stored in the upper bit positions of the constant register 36. Accordingly, when a 32-bit constant is divided into two 16-bit constants and each of the two constants is stored sequentially, for instance, the first constant to be stored is stored in the lower 16-bit area.

The constant register output unit 42 includes eight 2-input selectors 42a–42h. In accordance with control signals from the format decoder 21, the constant register output unit 42 controls the eight input selectors 41a–41h so that one of the following two types of processing is performed. For the first type of the processing, the constant held by the constant register 36 is output to the PC unit 33, L1 bus, R1 bus, L2 bus, or R2 bus in 4-bit units. For the second type of the processing, one of the 4-bit constants held by the P1.0 field 12 to the P3.2 field 18 of the instruction register 10 is output to the PC unit 33, L1 bus, R1 bus, L2 bus, or R2 bus.

As described above, the processor of the first modification can change any 4- or 8-bit stored value and reuse the unchanged value, by using an operation set including operation codes "set4a" to "set4h" for changing the stored value in one of the areas 36a–36h of the constant register, an operation code "setl8" for changing the lower 8 bits of the constant register 36, and an operation code "setu8" for changing only the upper 8bits.

The processor of the first modification can further freely link constants accumulated in the constant register and constants specified by operations in 4-bit units.

The processor of the present invention has been described above by means of the embodiment and the first modification, although it should be obvious that the present invention is not limited to the examples described above. Further variations are described below.

(1) In the above embodiment, an example dealing with a numeric constant is given, although it is of course equally possible for the invention to deal with a character constant. This is because a long character constant that is divided across a plurality of instructions can be accumulated by successively storing different parts of the character constant in the constant register 36.

(2) In the above embodiment, when a constant is stored in the constant register 36, the constant is subjected to the zero extension process. However, the processor of the present invention may be constructed so that, when a constant is stored in the constant register 36, the constant may be subjected to a zero/sign extension process. To do so, it is only necessary to add a circuit for controlling the extension process to the peripheral circuit of the constant register 36.

The sign extension process mentioned here is a process which, when the number of valid bits in a value is less a predetermined number of bits, regards the most significant bit in the value as a sign bit and fills the upper bit positions with the same logical value as the sign bit.

(3) In the above embodiment, a constant specified by an operation is linked to the lower bit side of the lower part of a value in the constant register 36 (where the upper part of the value is discarded) and an operation is executed using the link result as an operand. However, a constant specified by an operation may be linked to the upper bit side of the lower part of a value in the constant register 36 and an operation may be executed using the link result as an operand. Furthermore, by discarding the lower part of the value in the constant register 36 instead of the upper part, a constant specified by an operation may be linked to the upper bit side or the lower bit side of the value in the constant register 36 and an operation may be executed using the link result as an operand.

(4) As can be seen from the instruction formats shown in FIGS. 2B to 2D of the above embodiment, only a 4-bit or a 16-bit constant can be stored in the constant register 36 by a single instruction in the above embodiment, although this is not a limitation for the present invention. As examples, it is equally possible to define an instruction format whereby a 12-bit or a 28-bit constant can be stored in the constant register 36 by a single instruction. To do so, it is only necessary to change the connection pattern of the peripheral circuit of the constant register 36.

(5) The processor of the present embodiment is described as a VLIW processor that has two operation units, 37 and 38, although the present invention may, of course, also be applied to a processor without VLIW architecture that includes only one operation unit and processes instructions that only specify a single instruction.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A processor for decoding and executing an instruction, the processor comprising:
    an instruction register for storing the instruction;
    a decoding means for decoding the stored instruction;
    a constant storage means including a storage region;
    a constant transfer means which, in a first case when the decoding means has decoded that the instruction includes a first constant that should be stored into the constant storage means, transfers the first constant from the instruction register to the constant storage means; and
    an execution means which, in a second case when the decoding means has decoded that the instruction includes an operation code showing an operation that should be executed and a piece of an operand to be used for the operation, executes the operation using an operand obtained by linking the piece of the operand and a constant stored in the constant storage means.

2. The processor of claim 1,
    wherein the execution means includes:
    a first read means for reading the constant stored in the constant storage means in the second case;
    a second read means for reading the piece of the operand from the instruction register;
    a link means for linking the read constant with the read piece of the operand to generate an operand and outputting the operand; and
    an operation means for executing the operation using the output operand.

3. The processor of claim 2,
    wherein the link means shifts the read constant by a number of bits in the read piece of the operand and places the read piece of the operand at a blank position obtained after the read constant is shifted, so that the read constant and the read piece of the operand are linked.

4. The processor of claim 3,
    wherein the constant transfer means stores a valid state data indicating whether the constant storage means stores a valid constant,
    wherein when the valid state data indicates that the constant storage means does not store a valid constant in the first case, the constant transfer means transfers the first constant from the instruction register to the constant storage means so that the first constant becomes a valid constant, and
    when the valid state data indicates that the constant storage means stores a valid constant in the first case, the constant transfer means transfers the first constant from the instruction register to the constant storage means without deleting the stored valid constant and links the stored valid constant with the first constant to generate a new valid constant.

5. The processor of claim 4,
    wherein the constant transfer means shifts the valid constant in the constant storage means by a number of bits in the first constant and transfers the first constant from the instruction register to a blank area in the constant storage means obtained by shifting the valid constant, so that the valid constant and the first constant are linked.

6. The processor of claim 4,
    wherein the constant transfer means further stores position data showing an area of the storage region adjacent to a valid constant stored in the constant storage means, and
    the constant transfer means transfers the first constant from the instruction register to the storage region according to the position data to link the valid constant with the first constant.

7. The processor of claim 4,
    wherein when transferring the first constant from the instruction register to the constant storage means, the constant transfer means changes the valid state data to show that the constant storage means stores a valid constant, and
    when the first reading means reads a constant stored in the constant storage means, the constant transfer means clears the storage region and changes the valid state data to show that the constant storage means does not store a valid constant.

8. The processor of claim 3,
    wherein the constant transfer means further stores read state data showing whether a constant has been read from the constant storage means,
    wherein when the read state data shows that the constant has been read from the constant storage means in the first case, the constant transfer means clears the storage region, transfers the first constant from the instruction register to the constant storage means, and changes the read state data to show that a constant has not been read from the constant storage means,
    when the read state data shows that a constant has not been read from the constant storage means in the first case, the constant transfer means transfers the first constant from the instruction register to the constant storage means without deleting the constant in the constant storage means and links the constant with the first constant to generate a new constant, and
    when the first read means reads a constant from the constant storage means in the second case, the constant transfer means changes the read state data to show that the constant has been read from the constant storage means.

9. The processor of claim 2,
    wherein the constant transfer means further stores digit data showing a digit position adjacent to a valid constant stored in the constant storage means, and the link means links a piece of an operand read by the second read means at the digit position shown by the digit data concerning a constant read by the first read means to generate the operand.

10. The processor of claim 9,
wherein the constant transfer means further stores valid state data indicating whether the constant storage means stores a valid constant,
wherein when the valid state data indicates that the constant storage means does not store the valid constant in the first case, the constant transfer means transfers the first constant from the instruction register to the constant storage means so that the first constant becomes a valid constant, and
when the valid state data indicates that the constant storage means stores the valid constant in the first case, the constant transfer means transfers the first constant from the instruction register to the constant storage means without deleting the stored valid constant and links the stored valid constant with the first constant to generate a new valid constant.

11. The processor of claim 1,
wherein in a third case when the decoding means has decoded that the instruction includes an operation code showing an operation that should be executed and a constant stored in the constant storage means is an operand that should be used for the operation, the execution means executes the operation using the operand.

12. The processor of claim 11,
wherein the execution means includes:
a first read means for reading a constant stored in the constant storage means in either of the first case and the third case;
a second read means for reading a piece of an operand from the instruction register in the first case;
a link means for outputting an operand obtained by linking the read constant with the read piece of the operand in the first case and for outputting the read constant as an operand in the third case; and
an operation means for executing the operation of either the first case and the third case using the outputted operand.

13. The processor of claim 11,
wherein the constant storage means includes:
n constant registers from a first constant register to an nth constant register which each have a storage region of a predetermined number of bits so that the n constant registers have a total storage region of n times the predetermined number of bits (n being a natural number no less than 2),
the execution means includes:
n selection means from a first selection means to an nth selection means which each select and output a constant of the predetermined number of bits so that the n selection means output an operand of n times the predetermined number of bits in total,
wherein the first selection means is connected to an area of the instruction register of the predetermined number of bits and to the first constant register, and selects a constant of the predetermined number of bits in the instruction register in the second case and selects a constant stored in the first constant register in the third case, and
the mth selection means is connected to the (m−1)th constant register and to the mth constant register, and selects a constant stored in the (m−1)th constant register in the second case and selects a constant stored in the mth constant register in the third case (m being a natural number where $2 \leq m \leq n$); and
an operation means for executing an operation using an operand outputted from the n selection means.

14. A VLIW processor for decoding and executing an instruction, the instruction including a format field for storing a format code that specifies an instruction format and a plurality of operation fields for specifying operations that are to be processed in parallel,
the VLIW processor comprising:
an instruction register for storing the instruction;
a decoding means for decoding the format code held by the instruction register;
a constant storage means including a storage region;
a constant transfer means which, in a first case when the decoding means has referred to the format code and decoded that at least one of the plurality of operation fields includes a first constant that should be stored into the constant storage means, transfers the first constant from the instruction register to the constant storage means; and
an execution means which, in a second case when the decoding means has referred to the format code and decoded that at least one of the plurality of operation fields includes an operation code showing an operation that should be executed and a piece of an operand that should be used for the operation, executes the operation using an operand obtained by linking a constant stored in the constant storage means and the piece of the operand.

15. The VLIW processor of claim 14,
wherein the execution means includes:
a first read means for reading the constant stored in the constant storage means in the second case;
a second read means for reading the piece of the operand from the instruction register;
a link means for linking the read constant with the read piece of the operand to generate an operand and outputting the operand; and
an operation means for executing the operation using the output operand.

16. The VLIW processor of claim 15,
wherein the link means shifts the read constant by a number of bits in the read piece of the operand and places the read piece of the operand at a blank position obtained after the read constant is shifted, so that the read constant and the read piece of the operand are linked.

17. The VLIW processor of claim 16,
wherein the constant transfer means stores a valid state data indicating whether the constant storage means stores a valid constant,
wherein when the valid state data indicates that the constant storage means does not store a valid constant in the first case, the constant transfer means transfers the first constant from the instruction register to the constant storage means so that the first constant becomes a valid constant, and
when the valid state data indicates that the constant storage means stores a valid constant in the first case, the constant transfer means transfers the first constant from the instruction register to the constant storage means without deleting the stored valid constant and links the stored valid constant with the first constant to generate a new valid constant.

18. The VLIW processor of claim 17, wherein the constant transfer means shifts the valid constant in the constant storage means by a number of bits in the first constant and transfers the first constant from the instruction register to a blank area in the constant storage means obtained by shifting the valid constant, so that the valid constant and the first constant are linked.

19. The VLIW processor of claim 17, wherein the constant transfer means further stores position data showing an area of the storage region adjacent to a valid constant stored in the constant storage means, and the constant transfer means transfers the first constant from the instruction register to the storage region according to the position data to link the valid constant with the first constant.

20. The VLIW processor of claim 17, wherein when transferring the first constant from the instruction register to the constant storage means, the constant transfer means changes the valid state data to show that the constant storage means stores a valid constant, and when the first reading means reads a constant stored in the constant storage means, the constant transfer means clears the storage region and changes the valid state data to show that the constant storage means does not store a valid constant.

21. The VLIW processor of claim 16, wherein the constant transfer means further stores read state data showing whether a constant has been read from the constant storage means, wherein when the read state data shows that the constant has been read from the constant storage means in the first case, the constant transfer means clears the storage region, transfers the first constant from the instruction register to the constant storage means, and changes the read state data to show that a constant has not been read from the constant storage means, when the read state data shows that a constant has not been read from the constant storage means in the first case, the constant transfer means transfers the first constant from the instruction register to the constant storage means without deleting the constant in the constant storage means and links the constant with the first constant to generate a new constant, and when the first read means reads a constant from the constant storage means in the second case, the constant transfer means changes the read state data to show that the constant has been read from the constant storage means.

22. The VLIW processor of claim 15, wherein the constant transfer means further stores digit data showing a digit position adjacent to a valid constant stored in the constant storage means, and the link means links a piece of an operand read by the second read means at the digit position shown by the digit data concerning a constant read by the first read means to generate the operand.

23. The VLIW processor of claim 22, wherein the constant transfer means further stores valid state data indicating whether the constant storage means stores a valid constant, wherein when the valid state data indicates that the constant storage means does not store the valid constant in the first case, the constant transfer means transfers the first constant from the instruction register to the constant storage means so that the first constant becomes a valid constant, and when the valid state data indicates that the constant storage means stores the valid constant in the first case, the constant transfer means transfers the first constant from the instruction register to the constant storage means without deleting the stored valid constant and links the stored valid constant with the first constant to generate a new valid constant.

24. The VLIW processor of claim 15, wherein in a third case when the decoding means has decoded that at least one of the plurality of operation fields includes an operation code showing an operation that should be executed using a constant stored in the constant storage means as an operand, the execution means executes the operation using the operand.

25. The VLIW processor of claim 24, wherein the execution means includes:

a first read means for reading a constant stored in the constant storage means in either of the first case and the third case;

a second read means for reading a piece of an operand from the instruction register in the first case;

a link means for outputting an operand obtained by linking the read constant with the read piece of the operand in the first case and for outputting the read constant as an operand in the third case; and an operation means for executing the operation of either the first case and the third case using the outputted operand.

26. The VLIW processor of claim 24, wherein the constant storage means includes:

n constant registers from a first constant register to an nth constant register which each have a storage region of a predetermined number of bits so that the n constant registers have a total storage region of n times the predetermined number of bits (n being a natural number no less than 2), the execution means includes:

n selection means from a first selection means to an nth selection means which each select and output a constant of the predetermined number of bits so that the n selection means output an operand of n times the predetermined number of bits in total, wherein the first selection means is connected to an area of the instruction register of the predetermined number of bits and to the first constant register, and selects a constant of the predetermined number of bits in the instruction register in the second case and selects a constant stored in the first constant register in the third case, and the mth selection means is connected to the (m−1)th constant register and to the mth constant register, and selects a constant stored in the (m−1)th constant register in the second case and selects a constant stored in the mth constant register in the third case (m being a natural number where $2 \leq m \leq n$); and an operation means for executing an operation using an operand outputted from the n selection means.

* * * * *